(12) United States Patent
Watanabe et al.

(10) Patent No.: US 11,511,661 B2
(45) Date of Patent: Nov. 29, 2022

(54) VEHICULAR APPARATUS

(71) Applicant: KOITO MANUFACTURING CO., LTD., Tokyo (JP)

(72) Inventors: Ken Watanabe, Shizuoka (JP); Susumu Kaneko, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/227,558

(22) Filed: Apr. 12, 2021

(65) Prior Publication Data

US 2021/0229595 A1 Jul. 29, 2021

Related U.S. Application Data

(63) Continuation of application No. PCT/JP2019/039268, filed on Oct. 4, 2019.

(30) Foreign Application Priority Data

Oct. 16, 2018 (JP) .............................. JP2018-195217

(51) Int. Cl.
*B60Q 1/26* (2006.01)
*B60Q 1/50* (2006.01)
*G09G 3/20* (2006.01)

(52) U.S. Cl.
CPC ......... *B60Q 1/2615* (2013.01); *B60Q 1/2607* (2013.01); *B60Q 1/2619* (2013.01); *B60Q 1/50* (2013.01); *G09G 3/20* (2013.01); *G09G 2320/0626* (2013.01)

(58) Field of Classification Search
CPC ...... B60Q 1/2619; B60Q 1/2607; B60Q 1/50; G09G 3/20; G09G 2320/0626; G02B 6/0001; G02B 6/0033; G02B 6/0076; G02B 6/0075
USPC .......................................................... 362/84
See application file for complete search history.

(56) References Cited

U.S. PATENT DOCUMENTS

| | | |
|---|---|---|
| 2016/0281954 A1 | 9/2016 | Moisy et al. |
| 2017/0219179 A1 | 8/2017 | Hirata et al. |
| 2018/0304804 A1 | 10/2018 | Tatara et al. |
| 2019/0168664 A1 | 6/2019 | Tatara et al. |

(Continued)

FOREIGN PATENT DOCUMENTS

| | | |
|---|---|---|
| CN | 104718107 A | 6/2015 |
| CN | 104995452 A | 10/2015 |
| CN | 107148534 A | 9/2017 |

(Continued)

OTHER PUBLICATIONS

Extended European Search Report dated Sep. 9, 2021, issued in corresponding European Application No. 19872521.0. (11 pages).

(Continued)

*Primary Examiner* — Laura K Tso
(74) *Attorney, Agent, or Firm* — Buchanan Ingersoll & Rooney PC

(57) ABSTRACT

A vehicular apparatus includes: a housing that is configured to be attached to a vehicle; and a first light source and a second light source that are provided in the housing to emit light having main wavelengths in mutually different wavelength ranges. The first light source emits light having a main wavelength in 490 nm-498 nm while the vehicle is being automatically driven.

10 Claims, 21 Drawing Sheets

(56) References Cited

U.S. PATENT DOCUMENTS

2021/0101520 A1\* 4/2021 Schellinger ............... F21K 9/00

FOREIGN PATENT DOCUMENTS

| CN | 107709097 A | 2/2018 |
|----|----|----|
| CN | 108162874 A | 6/2018 |
| DE | 102005019018 A1 | 10/2006 |
| DE | 102016000938 A1 | 7/2016 |
| DE | 102015212652 A1 | 1/2017 |
| DE | 102016123085 A1 | 5/2018 |
| EP | 1391755 A2 | 2/2004 |
| EP | 2261083 A1 | 12/2010 |
| JP | 2017140929 A | 8/2017 |
| WO | 2016051491 A1 | 4/2016 |
| WO | 2016/191575 A1 | 12/2016 |
| WO | 2017073632 A1 | 5/2017 |
| WO | 2018021063 A1 | 2/2018 |
| WO | 2018/167096 A1 | 9/2018 |

OTHER PUBLICATIONS

International Search Report (PCT/ISA/210) and Written Opinion (PCT/ISA/237) dated Nov. 26, 2019, by the Japan Patent Office as the International Searching Authority for International Application No. PCT/JP2019/039268.
Chinese Office Action issued in CN Application No. 201980068074. X; dated Jun. 29, 2022. 18 Pages (with Translation).

\* cited by examiner

VEHICULAR APPARATUS

BACKGROUND OF THE INVENTION

1. Field of the Invention

The present invention relates to vehicular apparatuses and, more particularly, to a vehicular apparatus adapted to output light to alert that the vehicle is being automatically driven.

2. Description of the Related Art

Recently, development of automatic driving technology for vehicles has been undertaken. Patent literature 1 proposes lighting a sign lamp during automatic driving to alert that the vehicle is being automatically driven for the purpose of safety.

Patent Document 1: JP2017-140929

An illustrative purpose of an embodiment of the present invention is to provide a technology capable of reducing an impact on vehicle design when a vehicle is provided with a lamp unit for outputting light for alerting that the vehicle is being automatically driven.

SUMMARY OF THE INVENTION

A vehicular apparatus according to an embodiment of the present invention includes: a housing that is configured to be attached to a vehicle; and first and second light sources that are provided in the housing to emit light having main wavelengths in mutually different wavelength ranges. The first light source emits light having a main wavelength in 490 nm-498 nm while the vehicle is being automatically driven.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several Figures, in which.

DETAILED DESCRIPTION OF THE INVENTION

Figure 1:
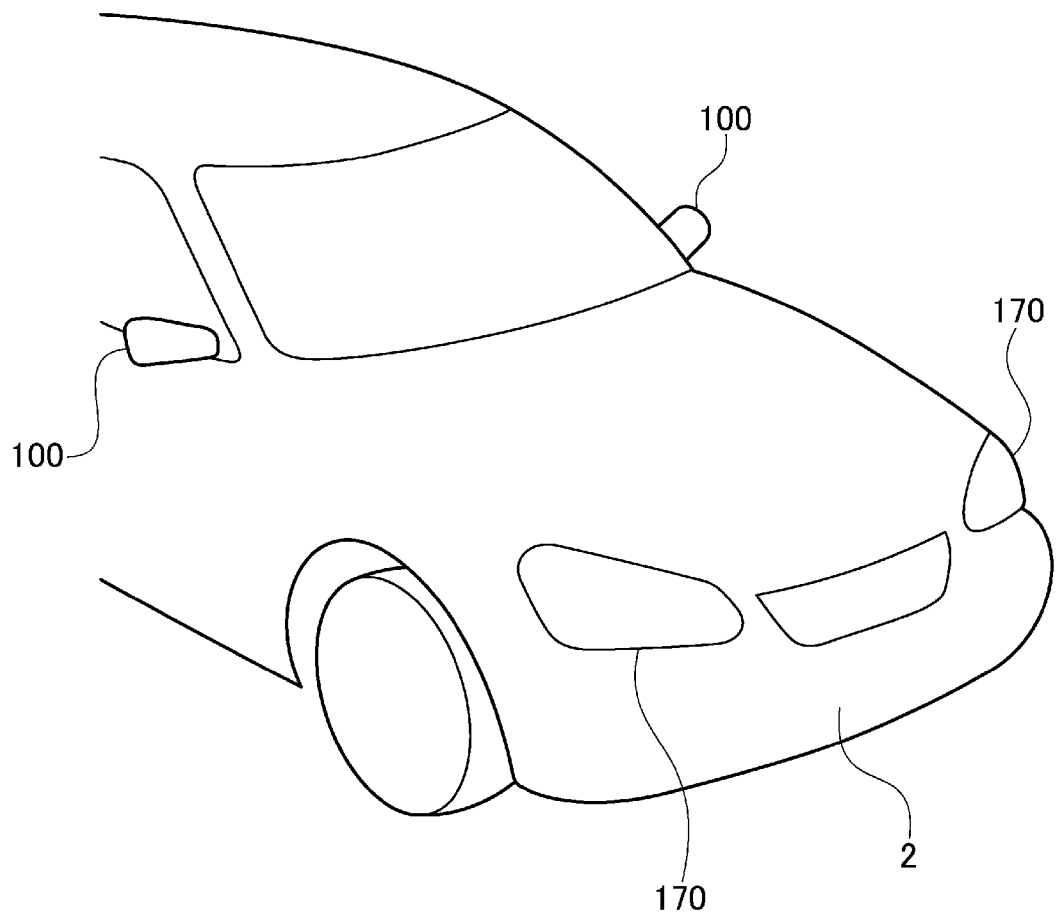
FIG. 1 is a plan view showing a vehicle provided with a vehicular apparatus according to the first embodiment.

Hereinafter, the present invention will be described based on preferred embodiments with reference to the accompanying drawings. Identical or like constituting elements, members, processes shown in the drawings are represented by identical symbols and a duplicate description will be omitted as appropriate. The embodiments do limit the scope of the invention but exemplify the invention. Not all of the features and the combinations thereof described in the embodiments are necessarily essential to the invention. Where a term indicating a direction such as "top", "bottom", "front", "back", "left", "right", etc. is used in the specification, the term signifies an orientation of a vehicular apparatus mounted on a vehicle.

FIG. 1 is a plan view showing a vehicle 1 provided with a vehicular apparatus according to the first embodiment. Extra-vehicular rear-view apparatuses 100, which are vehicular apparatuses, are attached on the left and right side of a vehicle body 2 of the vehicle 1. The extra-vehicular rear-view apparatus 100 corresponds to a door mirror or a fender mirror of the related art. Vehicle headlamps 170 are attached on the left and right sides of the frontal part of the vehicle body 2 of the vehicle 1.

Figure 2:
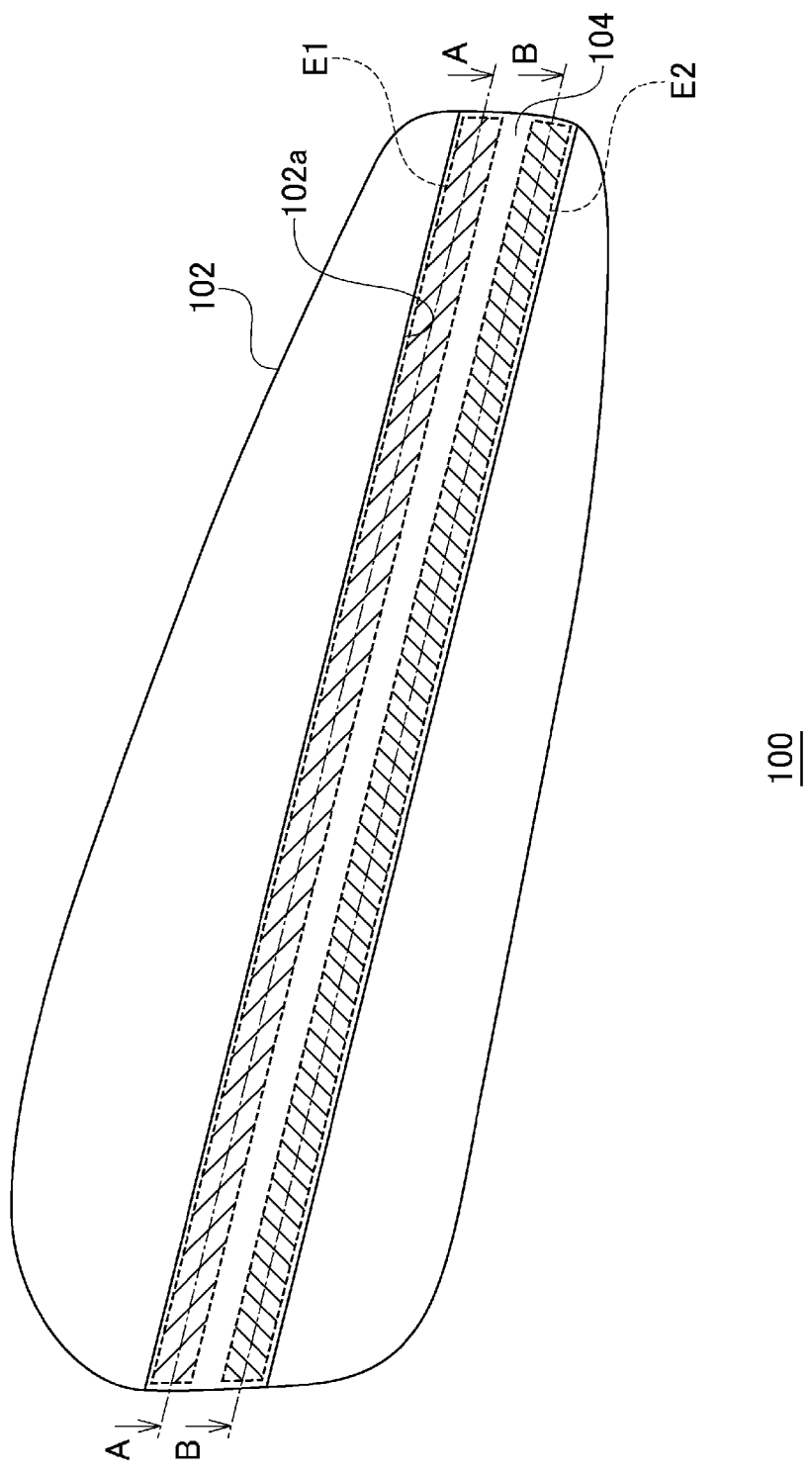
FIG. 2 is an enlarged view of an extra-vehicular rear-view apparatus according to the first embodiment.
Figure 3A:
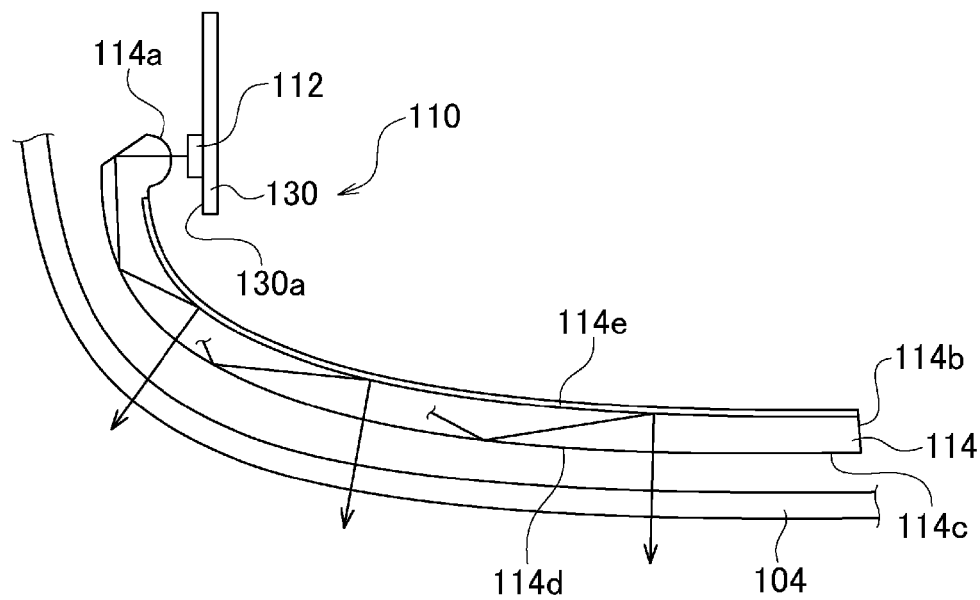
FIG. 3A is an A-A cross-sectional view of FIG. 2.
Figure 3B:
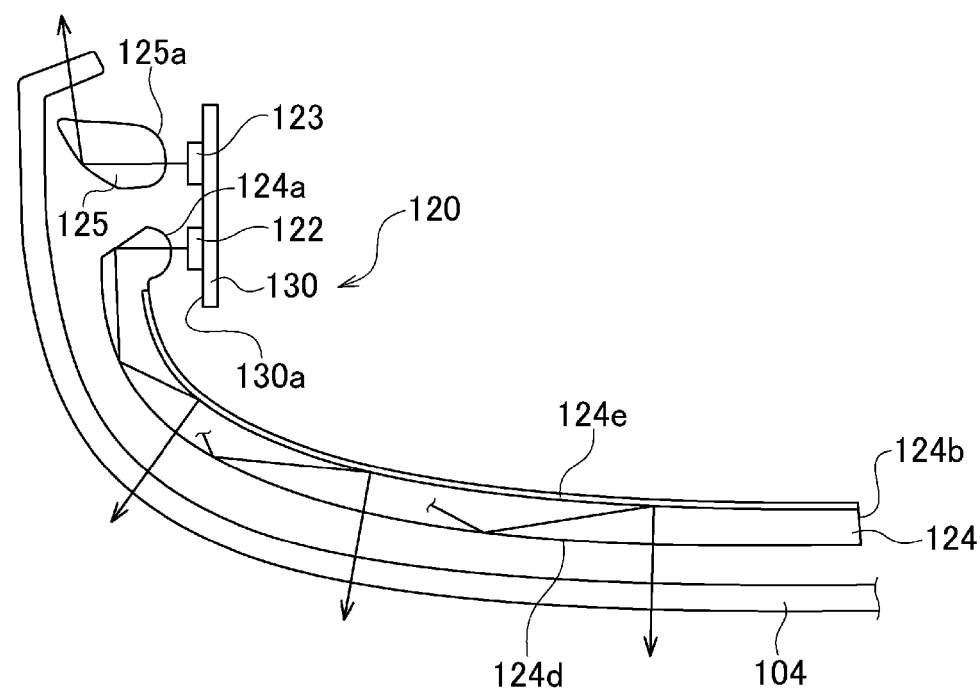
FIG. 3B is a B-B cross-sectional view of FIG. 2.

FIG. 2 is an enlarged view of the extra-vehicular rear-view apparatus 10 on the right side seen when the vehicle front is viewed. FIG. 3A is an A-A cross-sectional view of FIG. 2, and FIG. 3B is a B-B cross-sectional view of FIG. 2. The extra-vehicular rear-view apparatus 100 on the left side is the same as that of the extra-vehicular rear-view apparatus 100 on the right side except for the left and right reversal in the arrangement of the parts.

The extra-vehicular rear-view apparatus 100 is provided with a housing 102 configured to be attached to the vehicle body, a translucent cover 104 that covers an opening 102a of the housing 102, a first lamp unit 110, a second lamp unit 120, and a rear-view part (not shown) housed in the housing 102.

The opening 102a of the housing 102 is formed on a surface facing a space in front of the vehicle. The shape of the opening 102a is not limited to any particular shape. In the illustrated example, the opening 102a is formed to have an elongated shape extending in a substantially horizontal direction.

The first lamp unit 110 is a lamp unit lighted while the vehicle is automatically driven and is configured to output turquoise light to alert that the vehicle is automatically driven, and, more particularly, light having a main wavelength in a wavelength range of 490 nm-498 nm. The turquoise light emitted from the first lamp unit 110 is output outside the extra-vehicular rear-view apparatus 100 through the translucent cover 104.

The second lamp unit 120 is a side turn signal lamp (STSL) and is configured to output umber light, and, for example, light having a main wavelength in a wavelength range of 577 nm-587 nm. The umber light output from the second lamp unit 120 is output outside the extra-vehicular rear-view apparatus 100 through the translucent cover.

The light output from the first lamp unit 110 forms a light emission region denoted by E1 in FIG. 2, and the light output from second lamp unit 120 forms a light emission region denoted by E2 in FIG. 1.

The rear-view part includes at least one of a rear-view mirror or a rear-view camera. The driver can know the situation behind the vehicle by seeing the image captured by the rear-view part.

The first lamp unit 110 will be described in specific details. The first lamp unit 110 includes a first light source 112 and a rod-shaped first light conductor 114. The first light source 112 emits turquoise light having a main wavelength in a wavelength range of 490 nm-498 nm. For example, the first light source 112 may include three semiconductor light emitting devices (e.g., LEDs) emitting red, green, and blue light respectively and may combine the light from the three semiconductor light emitting devices to form the turquoise light.

The first light conductor 114 is made of a translucent resin material such as acrylic resin and polycarbonate resin. The same is true of the light conductors described later in this specification. The first light conductor 114 is curved and extends along a curved shape of the housing 102 in the illustrated example, but the shape is not limited to the illustrated example. For example, the first light conductor 114 may extend straight. The direction of extension of the first light conductor 114 (longitudinal direction) is generally aligned with the direction of vehicle width (the transversal direction in FIG. 3A), but the direction is not limited to the illustrated example. The cross section of the first light conductor 114 perpendicular to the longitudinal direction is not limited to any particular shape. For example, the cross section has a circular or rectangular shape.

The first light conductor 114 has one end surface, which is a light incidence surface 114a, the other end surface 114b, and a circumferential surface 114c, which connects these two end surfaces. The first light conductor 114 is arranged such that the light incidence surface 114a of the first light conductor 114 is positioned outward in the vehicle width direction, and the other end surface 114b is positioned inward in the vehicle width direction. The first light source 112 is provided to face the light incidence surface 114a. A reflecting structure 114e is formed in the part of the circumferential surface 114c of the first light conductor 114 opposite to an output surface 114d that faces the translucent cover 104 and generally facing the rear part of the vehicle. The reflecting structure 114e includes, for example, a plurality of reflecting steps each having a triangular cross section.

The turquoise light emitted from the first light source 112 is incident on the first light conductor 114 from the light incidence surface 114a, travels toward the other end surface 114b of the first light conductor 114. In that process, at least a portion of the light is reflected by the reflecting structure 114e toward the output surface 114d, is output outside the first light conductor 114 from the output surface 114d, is transmitted through the translucent cover 104, and is output outside the extra-vehicular rear-view apparatus 100.

The second lamp unit 120 will be described in specific details. The second lamp unit 120 includes two second light sources 122, 123 and two second light conductors 124, 125. The second light sources 122, 123 emit umber light, and, more specifically, light having a main wavelength in a wavelength range of 577 nm-587 nm. Like the first light source 112, the second light sources 122, 123 may be configured to include three semiconductor light emitting devices.

The second light conductor 124 is formed to have a shape similar to that of the first light conductor 114 and is provided below the first light conductor 114. The first light conductor 114 and the second light conductor 124 are arranged in alignment with each other in the vertical direction. The second light source 122 is provided to face the light incidence surface 124a of the second light conductor 124.

The umber light emitted from the second light source 122 is incident on the second light conductor 124 from the light incidence surface 124a, travels toward the other end surface 124b of the second light conductor 124. In that process, at least a portion of the light is reflected by the reflecting structure 124e toward the output surface 124d, is output outside the second light conductor 124 from the output surface 124d, is transmitted through the translucent cover 104, and is output outside the extra-vehicular rear-view apparatus 100.

The second light conductor 125 is provided behind the end of the second light conductor 124 toward the light incidence surface 124a to face the rear part of the vehicle. The second light source 123 is provided to face the light incidence surface 125a of the second light conductor 125. The second light conductor 125 outputs the umber light emitted from the second light source 123 substantially toward the rear part of the vehicle.

Figure 4:
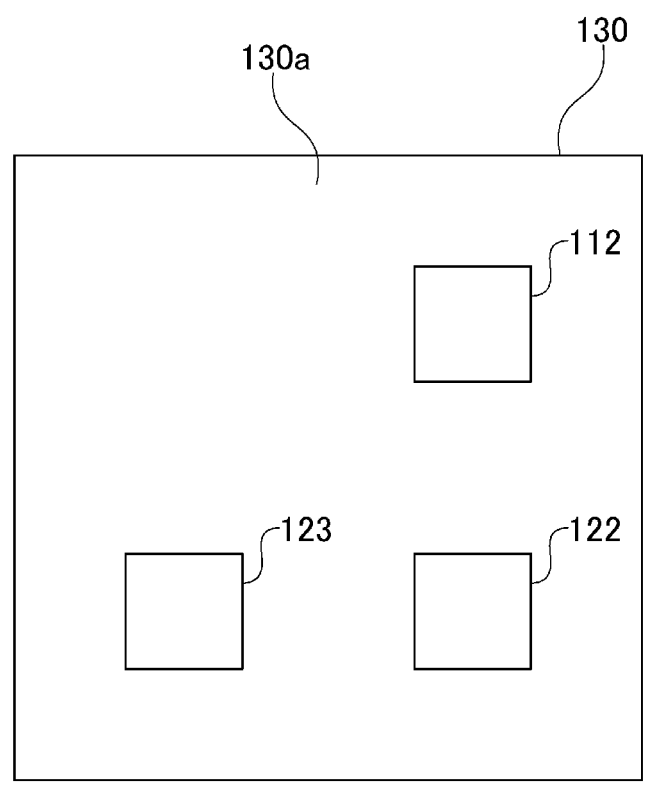
FIG. 4 is a view of a substrate on which the light sources of FIG. 3 are mounted as seen from the side of a mounting surface.

FIG. 4 is a view of a substrate 130 on which the light sources are mounted as seen from the side of a mounting surface 130a. The first light source 112 of the first lamp unit 110 and the two second light sources 122 of the second lamp unit 120 are mounted on the same substrate 130 in close proximity to each other.

According to the first embodiment described above, the first lamp unit that outputs the turquoise light to alert that the vehicle is being automatically driven is housed in the housing adapted to be attached to the vehicle along with the second lamp unit. In other words, the second lamp unit shares the housing with the other lamp unit. This reduces the number of housings attached to the vehicle and reduces the impact on vehicle design as compared with the other cases. According to this embodiment, the first lamp unit and the second lamp unit are housed in the housing of the extra-vehicular rear-view apparatus so that the impact on vehicle design is further reduced.

Second Embodiment

Figure 5:
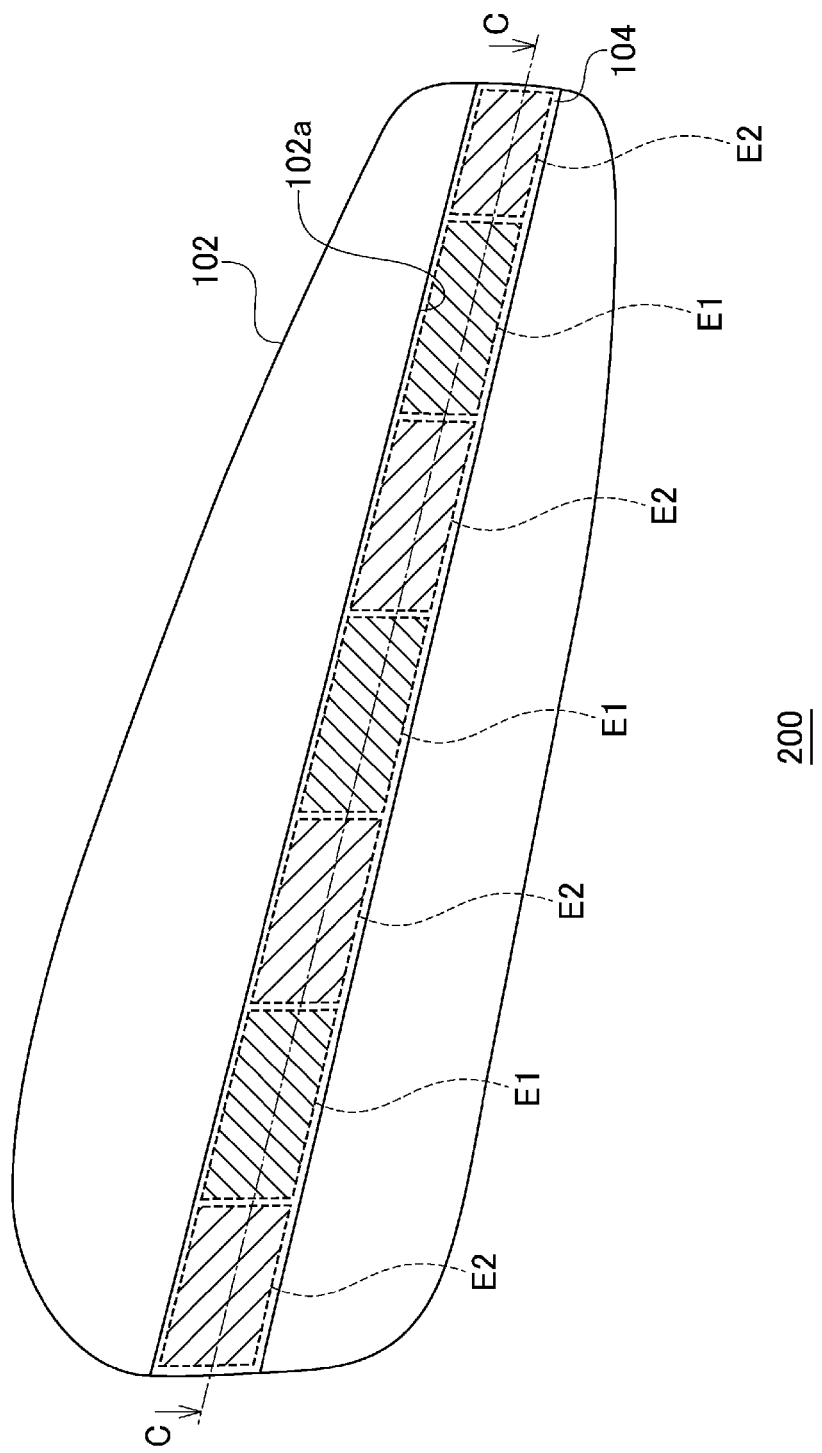
FIG. 5 is a perspective view showing an extra-vehicular rear-view apparatus according to the second embodiment.
Figure 6:
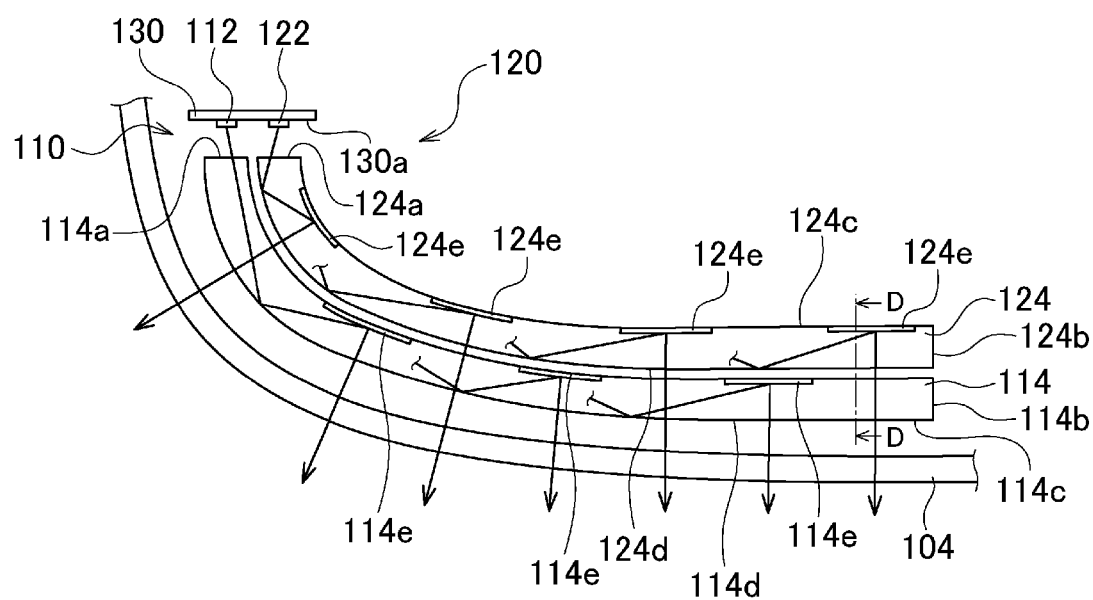
FIG. 6 is a C-C cross-sectional view of FIG. 5.

FIG. 5 is a perspective view showing an extra-vehicular rear-view apparatus 200 according to the second embodiment. FIG. 5 corresponds to FIG. 2. FIG. 6 is a C-C cross-sectional view of FIG. 5.

In this embodiment, the first lamp unit 110 and the second lamp unit 120 are arranged in alignment with each other in the horizontal direction. More specifically, the first light conductor 114 and the second light conductor 124 are arranged in close proximity to each other such that the output surface 114d of the first light conductor 114 and the output surface 124d of the second light conductor 124 face each other in the horizontal direction.

The plurality of reflecting structures 114e are provided at intervals in the part of the circumferential surface 114c of the first light conductor 114 opposite to the output surface 114d and generally facing the rear part of the vehicle. Similarly, the plurality of reflecting structures 124e are provided at intervals in the part of the circumferential surface 124c of the second light conductor 124 opposite to the output surface 124d and generally facing the rear part of the vehicle. The reflecting structure 124e includes, for example, a plurality of reflecting steps each having a triangular cross section.

The light reflected by the reflecting structure 124e of the second light conductor 124 and output from the output surface 124d is incident on the first light conductor 114 from the circumferential surface 114c and is output from the output surface 114d. In other words, the light output from the second light conductor 124 is transmitted through the first light conductor 114 and is output outside the extra-vehicular rear-view apparatus 100.

In the illustrated example, the plurality of reflecting structures 114e of the first light conductor 114 are formed at positions outside the light path of the light from the second light conductor. This inhibits mixture of the turquoise light from the first lamp unit to alert that the vehicle is being automatically driven with the umber light from the second lamp unit that is a side turn signal lamp.

Figure 7A:
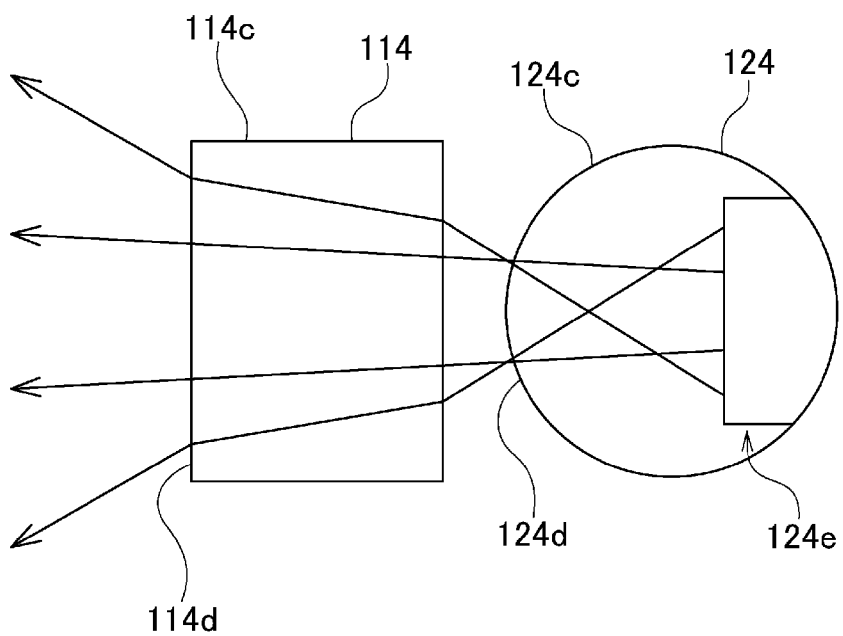
FIGS. 7A and 7B are examples of D-D cross-sectional views of FIG. 6.
Figure 7B:
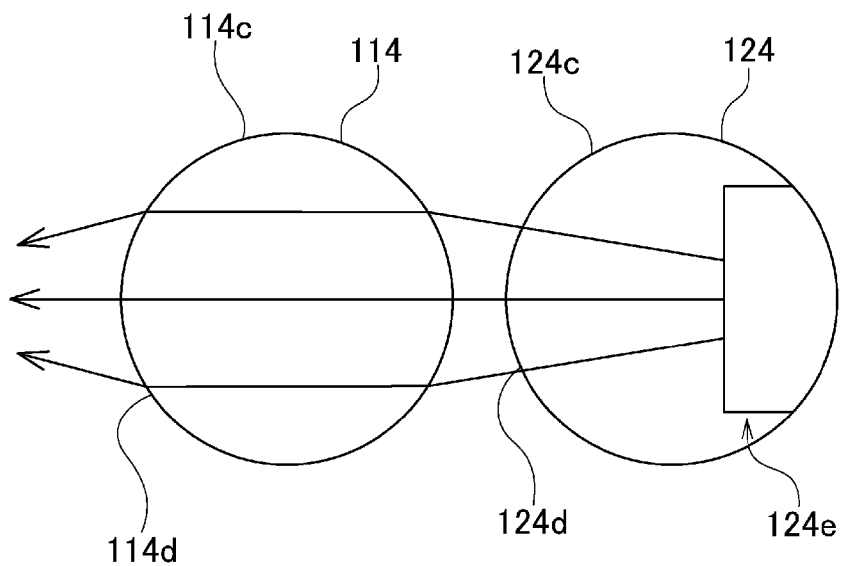

FIGS. 7A and 7B are examples of D-D cross-sectional views of FIG. 6. In the example of FIG. 7A, the cross section of the first light conductor 114 is rectangular, and the cross section of the second light conductor 124 is circular. In this case, the light from the second light conductor 124 is condensed vertically by the first light conductor 114. In the example of FIG. 7B, the cross section of both the first light conductor 114 and the second light conductor 124 is circular. In this case, the light from the second light conductor 124 is diffused vertically by the first light conductor 114.

According to the second embodiment described above, the same advantage as provided by the first embodiment can be provided. In further accordance with the second embodiment, the first light conductor of the first lamp unit 110 and the second light conductor of the second lamp unit are arranged in alignment with each other in the horizontal direction so that the vertical space required for the two lamp units can be reduced. Further, the reflecting structures 114e of the first light conductor 114 are provided outside the light path of the light from the second light conductor 124 so that mixture of the light from the two lamp units is prevented. In other words, the second embodiment allows reducing a vertical space required for the two lamp units, while at the same preventing mixture of the light from the two lamp units.

The arrangement of the first lamp unit 110 and the second lamp unit 120 may be reversed. In this case, the light output from the first light conductor 114 is transmitted through the second light conductor 124 and is output outside the extra-vehicular rear-view apparatus 100.

Third Embodiment

Figure 8:
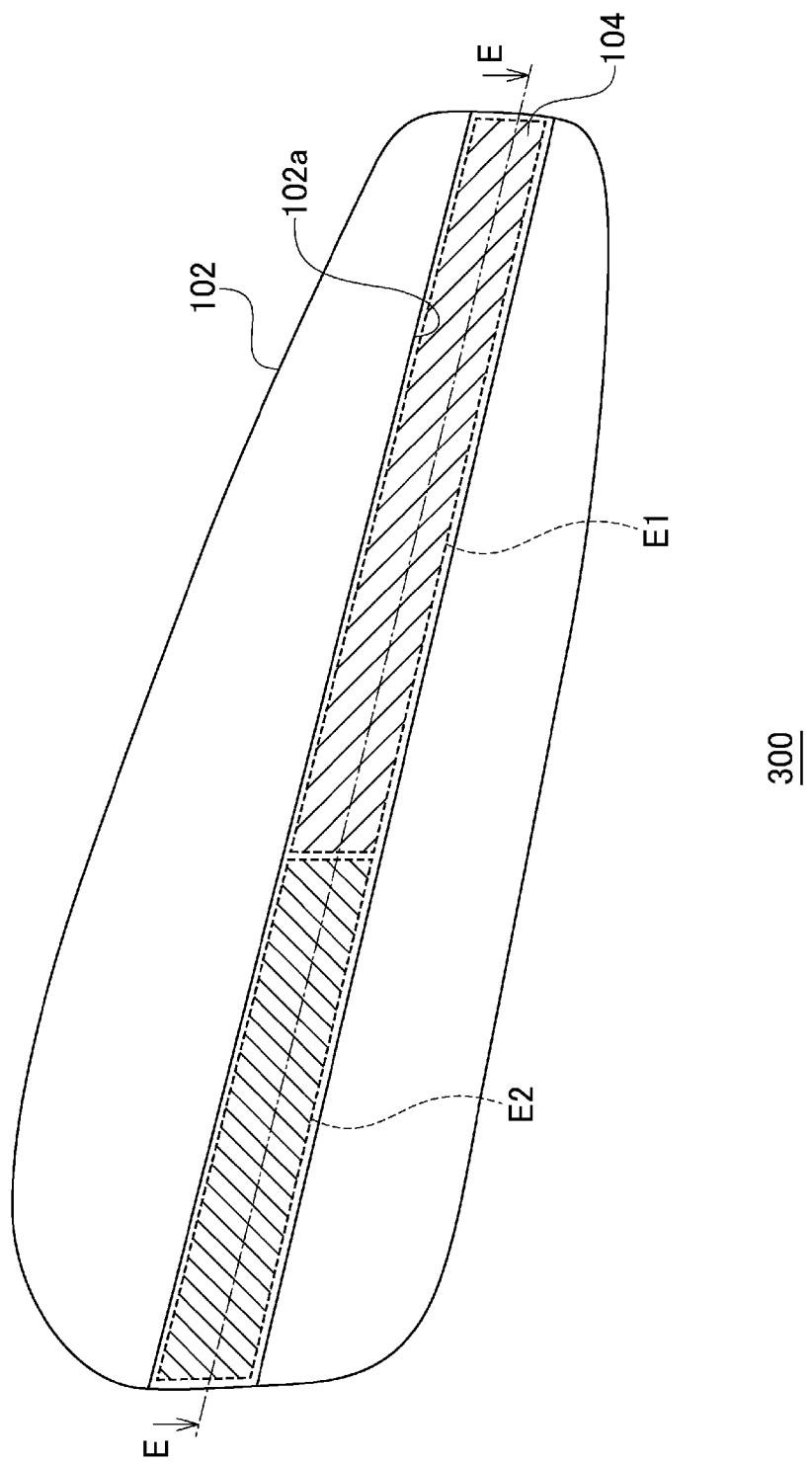
FIG. 8 is a perspective view showing an extra-vehicular rear-view apparatus according to the third embodiment.
Figure 9:
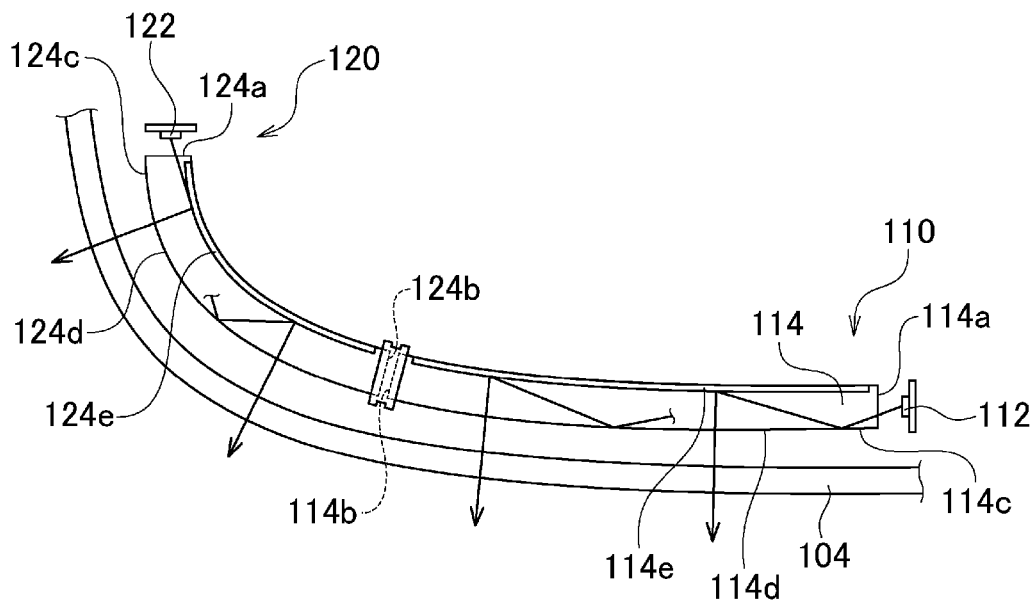
FIG. 9 is an E-E cross-sectional view of FIG. 8.

FIG. 8 is a perspective view showing an extra-vehicular rear-view apparatus 300 according to the third embodiment. FIG. 8 corresponds to FIG. 2. FIG. 9 is an E-E cross-sectional view of FIG. 8.

In this embodiment, the first light conductor 114 and the second light conductor 124 are provided adjacent to each other such that the end surfaces 114b, 124b opposite to the respective light incidence surfaces 114a, 124a face each other.

Figure 10:
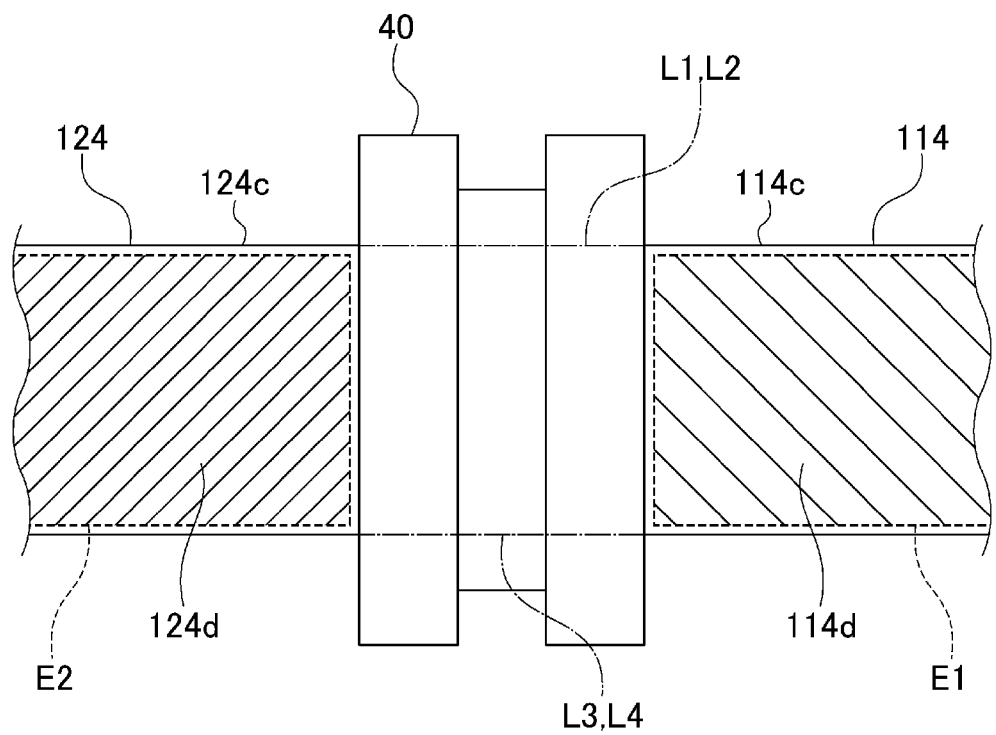
FIG. 10 is a front enlarged view of the neighborhood of the portion where the first light conductor and the second light conductor of FIG. 8 are adjacent to each other.

FIG. 10 is a front enlarged view of the neighborhood of the portion where the first light conductor 114 and the second light conductor 124 are adjacent to each other. It is assumed here that the cross section of both the first light conductor 114 and the second light conductor 124 is rectangular, and the output surface 114d and the output surface 124d are side surfaces of the first light conductor 114 and the second light conductor 124, respectively, that generally face the frontal part of the vehicle. An extension L1 of the upper edge of the output surface 114d of the first light conductor 114 and an extension L2 of the upper edge of the output surface 124d of the second light conductor 124 are smoothly continuous, i.e., are aligned. Similarly, an extension L3 of the lower edge of the output surface 114d of the first light conductor 114 and an extension L4 of the lower edge of the output surface 124d of the second light conductor 124 are smoothly continuous, i.e., are aligned. Further, the output surface 114d of the first light conductor 114 and the output surface 124d of the second light conductor 124 are adjacent. It can therefore be ensured that the light emission region E1 produced by the first lamp unit 110 and the light emission region E2 produced by the second lamp unit 120 are viewed as a continuous linear or belt-like light emission region.

Figure 11A:
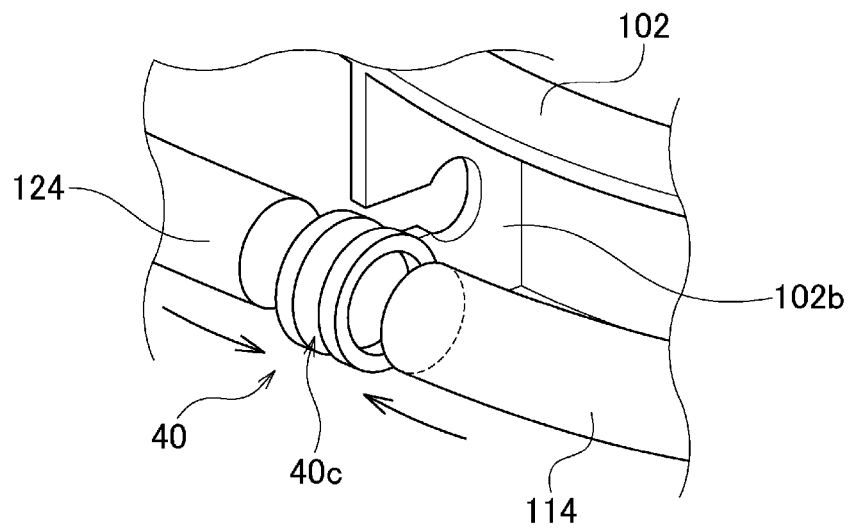
FIGS. 11A-11C are diagrams to explain the structure for inhibiting mixture of the light of the two lamp units.
Figure 11B:
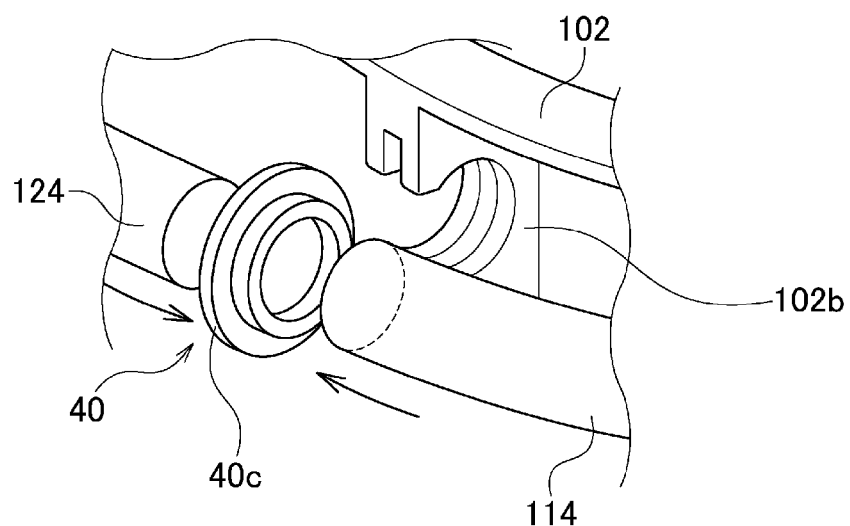
Figure 11C:
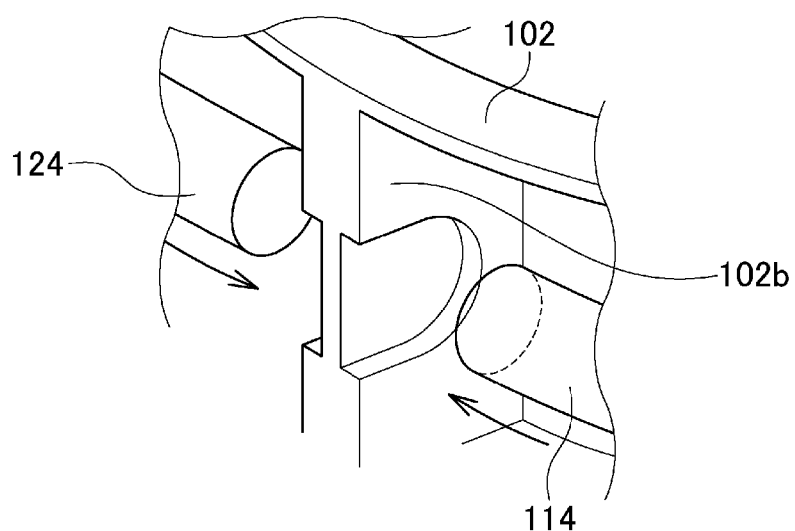

FIGS. 11A-11C are diagrams to explain the structure for inhibiting mixture of the light of the two lamp units. In the examples of FIGS. 11A and 11B, the ends of the two lamp units are blocked by a cap 40 to prevent the light from each of light conductors from entering the other light conductor. The ends of the first light conductor 114 and the second light conductor 124 are fit in a non-through hole 40a formed in the cap 40, and the cap 40 is supported by a rib 102b provided on the inner surface of the housing 102. Therefore, the first light conductor 114 and the second light conductor 124 are supported by the housing 102 via the cap 40. In the example of FIG. 11A, the rib 102b is fitted in an annular groove 40b formed in the cap 40 to restrict the movement of the cap 40, and ultimately, the first light conductor 114 and the second light conductor 124. In the example of FIG. 11B, a flange 40c formed in the cap 40 is fitted in the rib 102b to restrict the movement of the cap 40, and ultimately, the first light conductor 114 and the second light conductor 124. In the example of FIG. 11C, the space between the light conductors is blocked by the rib 102b provided on the inner surface of the housing 102 to prevent the light from each of light conductors from entering the other light conductor. The ends of the first light conductor 114 and the second light conductor 124 are supported by the rib 102b.

According to the third embodiment described above, the same advantage as provided by the first embodiment can be provided. In further accordance with the second embodiment, a vehicular apparatus capable of novel light emission is realized.

Fourth Embodiment

Figure 12A:
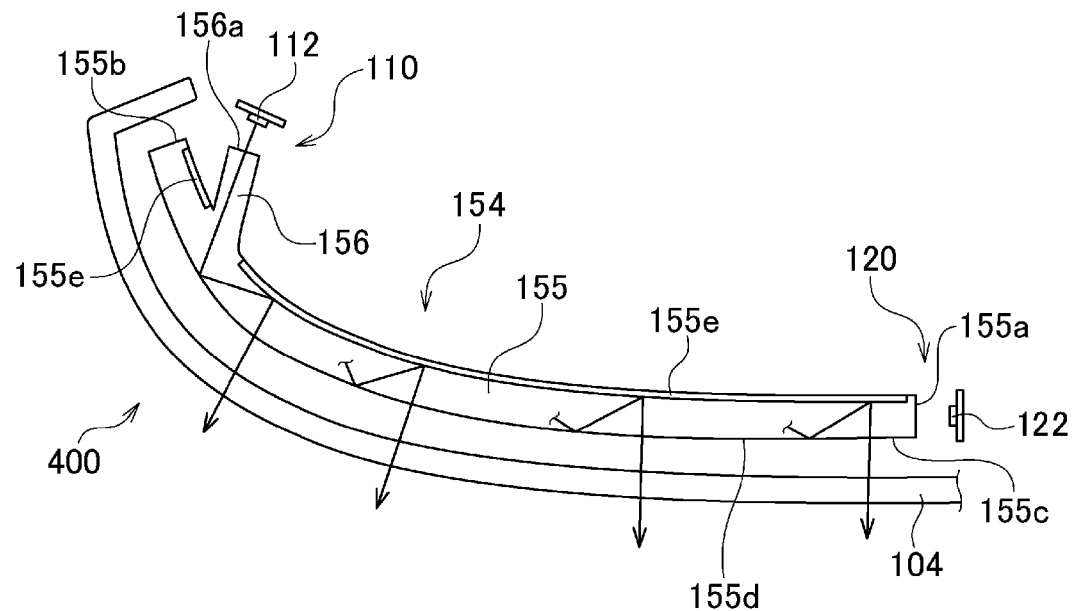
FIGS. 12A and 12B are cross-sectional views of an extra-vehicular rear-view apparatus according to the fourth embodiment.
Figure 12B:
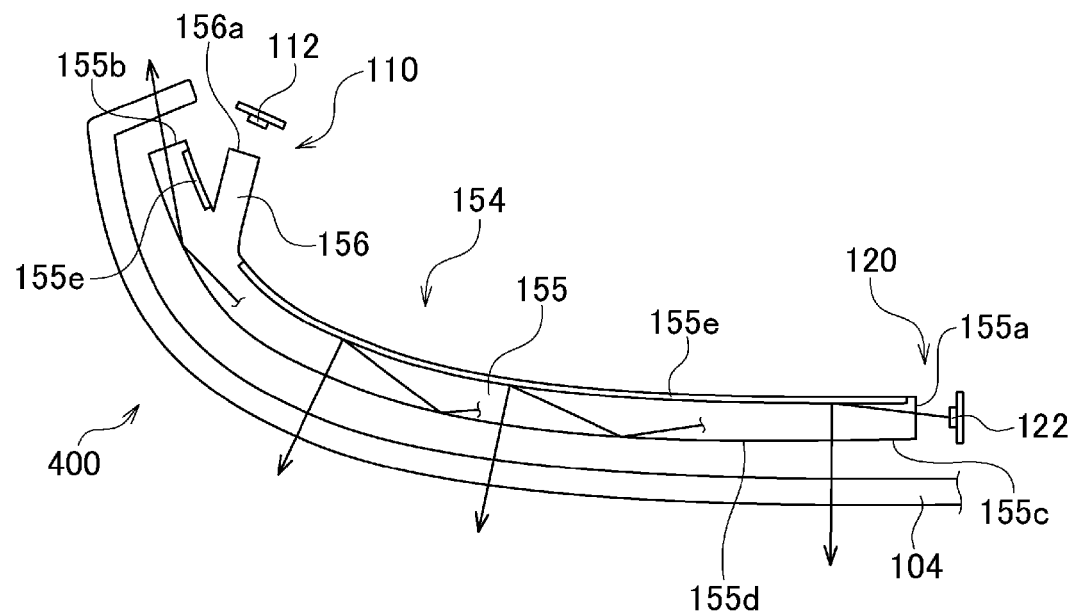

FIGS. 12A and 12B are cross-sectional views of an extra-vehicular rear-view apparatus 400 according to the fourth embodiment. FIG. 12A shows a state in which the first lamp unit 110 is lighted, and FIG. 12B shows a state in which the second lamp unit 120 is lighted.

In this embodiment, the first lamp unit 110 and the second lamp unit 120 are provided with a single, common light conductor 154. The light conductor 154 includes a main body part 155 and a lateral branch part 156 connected to the main body part 155. The main body part 155 is curved as it extends from one side to the other side in the direction of vehicle width and extends toward the rear part of the vehicle. One end surface 155a of the main body part 155 faces inward in the direction of vehicle width, and the other end surface 155b of the main body part faces the rear part of the vehicle. The second light source 122 is provided to face the end surface 155a that faces inward in the direction of vehicle width. The light output from the second light source 122 is incident from the end surface 155a. In other words, the end surface 155a is the light incidence surface of the second lamp unit 120. A portion of the light from the second light source 122 incident on the main body part 155 is reflected by a reflecting structure 155e, is output outside from an output surface 155d of the circumferential surface 155c toward the frontal part of the vehicle. At least a portion of the other light is output from the other end surface 155b of the main body part.

The lateral branch part 156 has a light incidence surface 156a. The lateral branch part 156 is connected to the neighborhood of the other end surface 155b of the main body part 155 in the illustrated example. Alternatively, the lateral branch part 156 may be connected at an arbitrary position of the main body part 155. The first light source 112 is provided to face the light incidence surface 156a of the lateral branch part 156. The light emitted from the first light source 112 is incident from the light incidence surface 156a of the lateral branch part 156, is incident on the main body part 155 from the lateral branch part 156, travels toward the end surface 155a of the main body part 155. In that process, at least a portion of the light is reflected by the reflecting structure 155e, and is output outside from the output surface 155d.

Figure 13A:
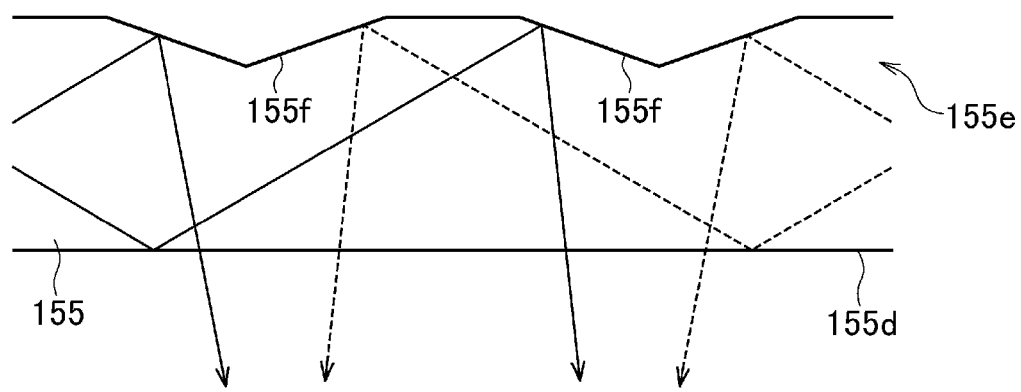
FIGS. 13A-13C are enlarged cross-sectional views each showing the reflecting structure.
Figure 13B:
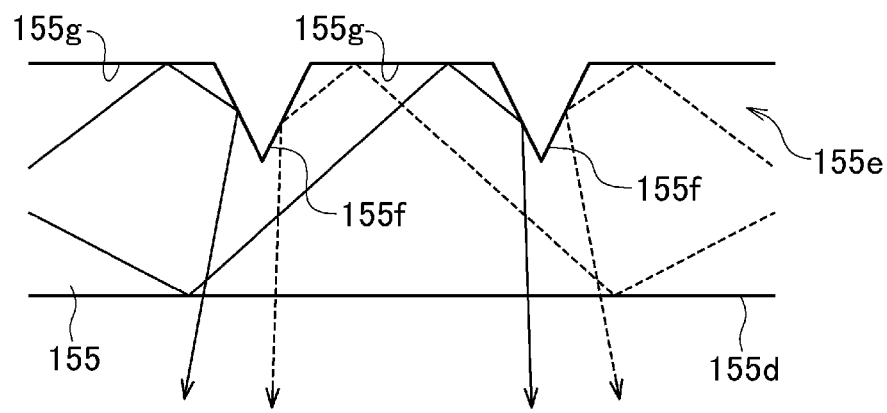
Figure 13C:
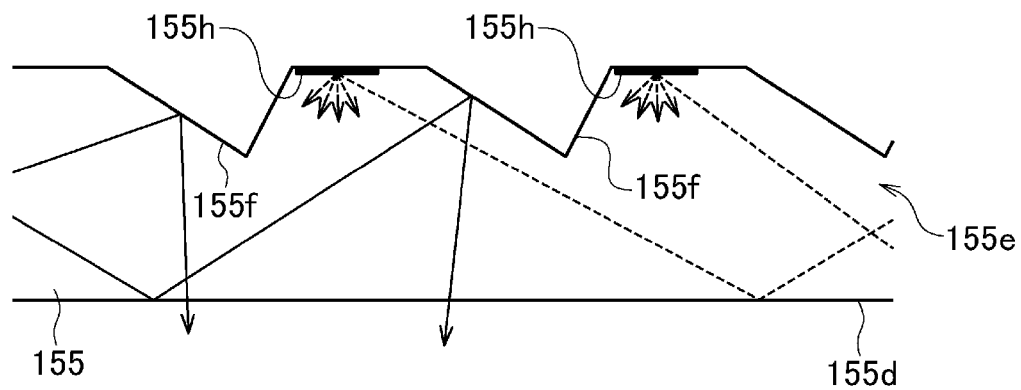

FIGS. 13A-13C are enlarged cross-sectional views each showing the reflecting structure 155e. In FIGS. 13A-13C, the light from the first light source 112 is indicated by the solid line, and the light from the second light source 122 is indicated by the broken line.

Referring to FIG. 13A, the reflecting structure 155e includes a plurality of steps 155f each having a triangular cross section. In this example, a portion of the light from the first light source 112 traveling in the main body part 155 is reflected by the steps 155f and is output outside from the output surface 155d. Similarly, a portion of the light from the second light source 122 traveling in the main body part 155 is reflected by the steps 155f and is output outside from the output surface 155d.

Referring to FIG. 13B, the reflecting structure 155e includes a plurality of steps 155f each having a triangular cross section. In this example, a portion of the light from the first light source traveling inside the light conductor is reflected by a flat surface 155g between the step 115f and the step 155f before being reflected by the step 155f. In other words, the light is reflected twice in the reflecting structure 155e and is output from the output surface 155d. Similarly, a portion of the light from the second light source 122 traveling in the main body part 155 is reflected by a flat surface 155g between the step 115f and the step 155f before being reflected by the step 155f. In other words, the light is reflected twice in the reflecting structure 155e and is output from the output surface 155d.

Referring to FIG. 13C, the reflecting structure 155e, the plurality of steps 155f each having a triangular cross section, and a plurality of embosses 155h (small convexities and concavities) are included. The steps 155f and the embosses 155h may or may not be provided alternately. In this example, a portion of the light from the first light source 112 traveling in the main body part 155 is reflected by the steps 155f and is output outside from the output surface 155d. A portion of the light from the second light source 122 traveling in the main body part 155 is diffusely reflected by the embosses 155h and is output outside from the output surface 155d. The second lamp unit 120 diffuses and then outputs the light and so produces relatively uniform brightness. The regulation does not require so high a light intensity of the second lamp unit 120 that is a turn signal lamp. Therefore, the configuration like the one described above can be employed.

According to the fourth embodiment described above, the same advantage as provided by the first embodiment can be provided.

Fifth Embodiment

Figure 14:
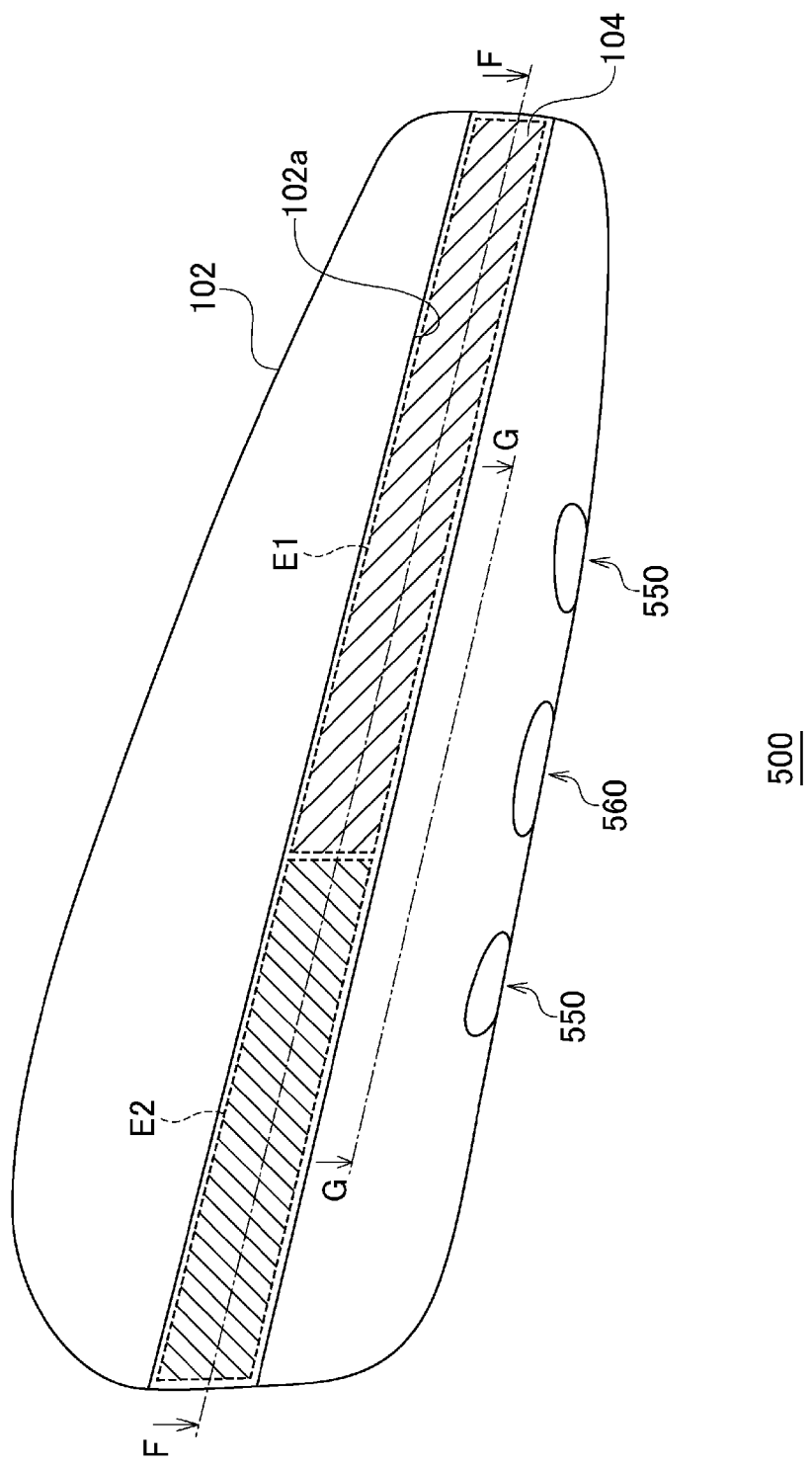
FIG. 14 is a perspective view showing an extra-vehicular rear-view apparatus according to the fifth embodiment.
Figure 15A:
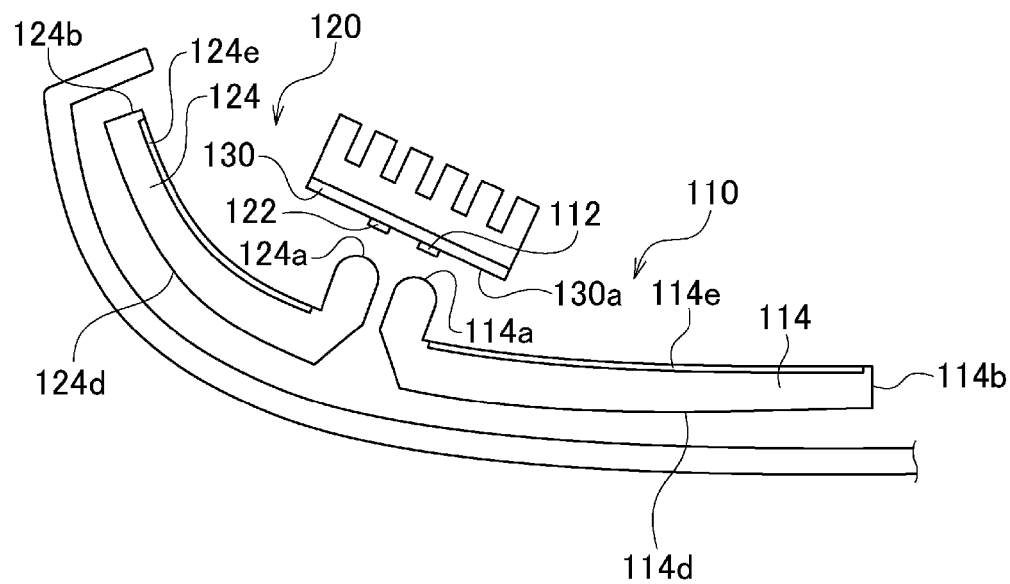
FIG. 15A is an F-F cross-sectional view of FIG. 14.
Figure 15B:
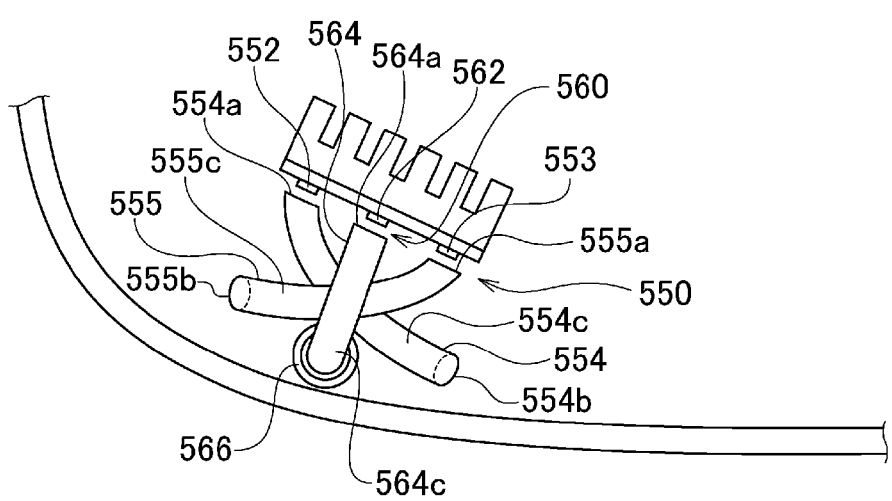
FIG. 15B is a G-G cross-sectional view of FIG. 14.

FIG. 14 is a perspective view showing an extra-vehicular rear-view apparatus 500 according to the fifth embodiment. FIG. 15A is an F-F cross-sectional view of FIG. 14, and FIG. 15B is a G-G cross-sectional view of FIG. 14.

In this embodiment, the extra-vehicular rear-view apparatus 500 is further provided with a third lamp unit 550 and a fourth lamp unit 560. The third lamp unit 550 is an infrared projector used to detect an obstacle, etc. and is configured to output infrared light, and, for example, near infrared light having a wavelength of 770 nm-1 μm. The fourth lamp unit 560 is a lamp unit for drawing information such as characters, graphics, symbol, etc. on a road.

The third lamp unit 550 includes two third light sources 552, 553 and two third light conductors 554, 555. The third light sources 552, 553 are, for example, semiconductor light emitting devices and emit infrared light, and, for example, near infrared light having a wavelength of 770 nm-1 μm.

The third light conductor 554 is rod-shaped and includes one end surface, which is a light incidence surface 554a, another end surface, which is a light output surface 554b, and a circumferential surface 554c, which connects the two end surfaces. Similarly, the third light conductor 555 is rod-shaped and includes a light incidence surface 555a, a light output surface 555b, and a circumferential surface 555c. The third light conductor 554 extends such that the light output surface 554b faces downward and frontward, and the third light conductor 555 extends such that the light output surface 555b faces downward and rearward. The third light sources 552, 553 are provided to face the light incidence surface 554a, 555a.

The light emitted from the third light source 552 is incident on the third light conductor 554 from the light incidence surface 554a, travels inside the third light conductor 554, and is output from the light output surface 554b. The light emitted from the third light source 553 is incident on the third light conductor 555 from the light incidence surface 555a, travels inside the third light conductor 555, and is output from the light output surface 555b.

The fourth lamp unit 560 includes a fourth light source 562, a fourth light conductor 564, and a shade 566. The fourth light source 562 is, for example, a semiconductor light emitting device. The fourth light conductor 564 is rod-shaped and includes one end surface, which is a light incidence surface 564a, another end surface (not shown in FIGS. 14, 15A, 15B), which is a light output surface, and a circumferential surface 564c, which connects the two end surfaces. The fourth light conductor 564 extends such that the light output surface faces downward in this example. Alternatively, the fourth light conductor 564 may extend such that the light output surface downward and frontward or downward and rearward. The fourth light source 562 is provided to face the light incidence surface 564a. The light emitted from the fourth light source 562 is incident on the fourth light conductor 564 from the light incidence surface 564a, travels inside the fourth light conductor 564, and is output from the light output surface.

Figure 16:
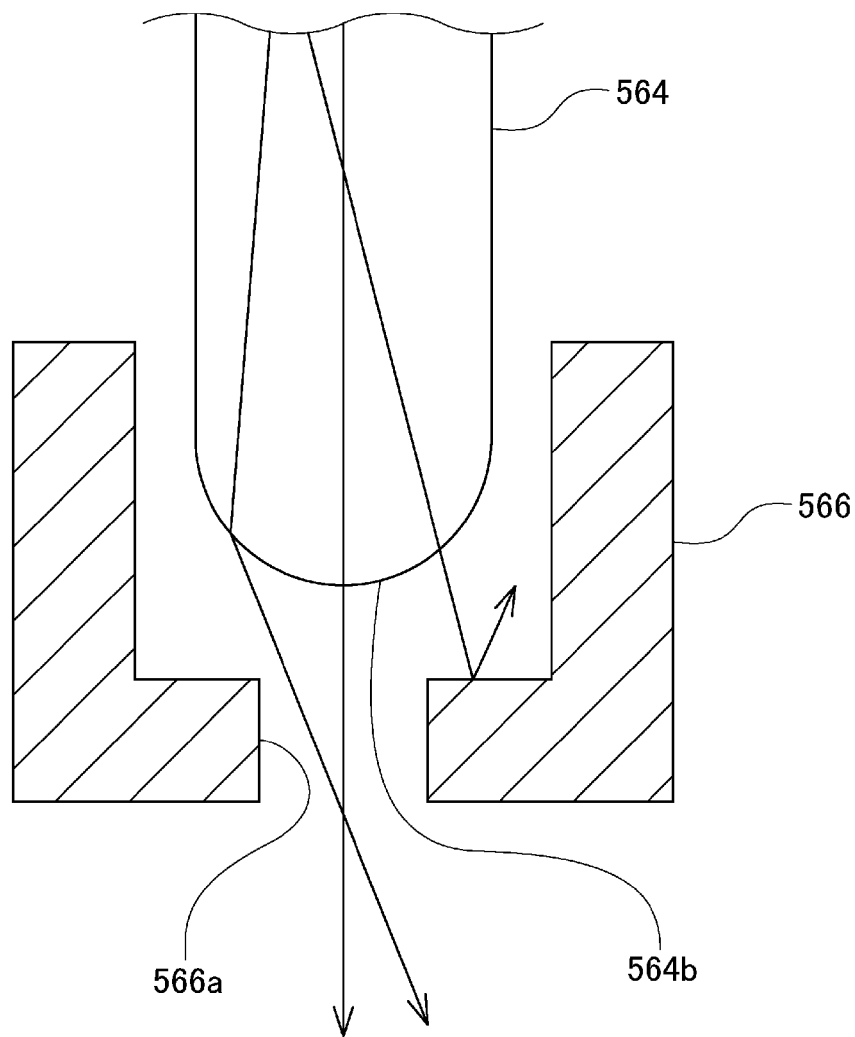
FIG. 16 is a cross-sectional view showing the shade and the neighborhood thereof.

FIG. 16 is a cross-sectional view showing the shade 566 and the neighborhood thereof. The shade 566 is provided to face a light output surface 564b of the fourth light conductor 564. An output hole 566a of a shape corresponding to the drawing information drawn on the road is formed in the shade 566. Of the light output from the light output surface 564b of the fourth light conductor 564, only the light that passes through the output hole 566a of the shade 566 is projected onto the road. Therefore, the drawing information of a shape corresponding to the output hole 566a of the shade 566 is drawn on the road.

Referring back to FIGS. 14, 15A, 15B, the first light source 112 of the first lamp unit 110, the second light source 122 of the second lamp unit 120, the third light sources 552, 553 of the third lamp unit 550, and the fourth light source 562 of the fourth lamp unit 560 are mounted on the same substrate 130 at close proximity to each other.

According to the fifth embodiment described above, the same advantage as provided by the first embodiment can be provided.

Sixth Embodiment

Figure 17:
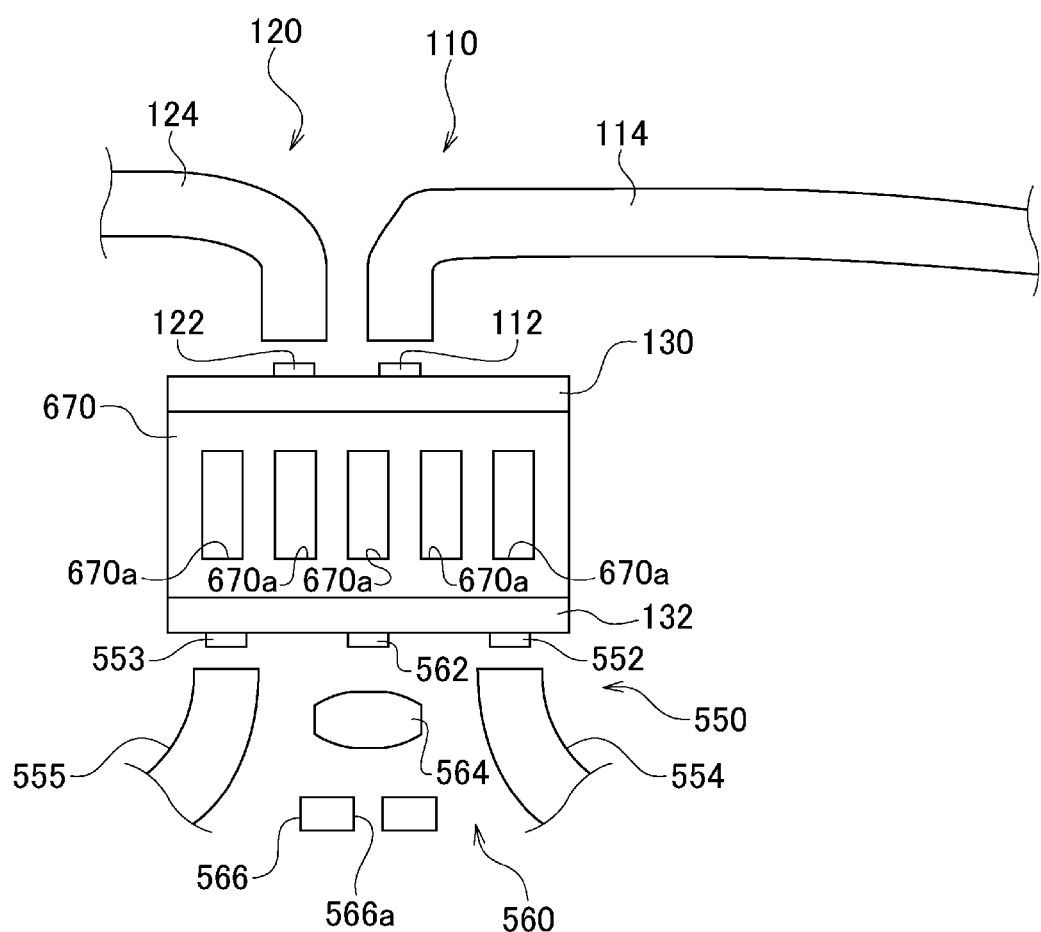
FIG. 17 shows lamp units of an extra-vehicular rear-view apparatus according to the sixth embodiment.

FIG. 17 shows lamp units of the extra-vehicular rear-view apparatus according to the sixth embodiment. In this embodiment, the first light source 112 of the first lamp unit 110 and the second light source 122 of the second lamp unit 120 are mounted on the substrate 130, and the two third light sources 552 of the third lamp unit 550 and the fourth light source 562 of the fourth lamp unit 560 are mounted on a substrate 132. The two substrates 130, 132 are fixed to a heat dissipating member 670 to sandwich the heat dissipating member 670. The heat dissipating member 670 is made of, for example, aluminum and dissipates the heat generated in the light sources. The shape of the heat dissipating member 670 is not limited to any particular shape. In the illustrated example, the heat dissipating member 670 has a cubic form, and at least one hole 670a is formed. The hole 670a is a through hole in illustrated example, but the hole 670a may be a non-through hole. Formation of the hole 670a increases the surface area of the heat dissipating member 670 and improves heat dissipation performance as compared with the case where the hole 670a is not formed. In the case the hole 670a is a through hole, convection flow of air is easily produced near the heat dissipating member 670, promoting heat dissipation.

According to the sixth embodiment described above, the same advantage as provided by the first embodiment can be provided. In further accordance with the sixth embodiment, the heat generated by the light sources is efficiently dissipated.

A description is given above of the configuration and operation of the vehicular apparatus according to the embodiments. The embodiments are intended to be illustrative only and it will be understood by those skilled in the art that various modifications to constituting elements could be developed and that such modifications are also within the scope of the present invention.

(Variation 1)

In the embodiment, it is described that the first lamp unit that outputs turquoise light for alerting that the vehicle is automatically driven is housed in the extra-vehicular rear-view apparatus 100 along with the second lamp unit. The embodiments are non-limiting, and the lamp unit may be housed in an arbitrary vehicular apparatus configured to be attached to the vehicle and provided with a component having a function different from that of the lamp unit.

The above-mentioned component may be a rear-view part, and, more specifically, a camera that images information to the side of the vehicle and displays the information on a monitor in the vehicle interior. The vehicular apparatus may be an apparatus provided only with the rear-view part and the first lamp unit.

Alternatively, the component may be any of various sensors, and, for example, a sensor for automatic driving (e.g., Lidar). In this case, the vehicular apparatus may be an apparatus provided only with the sensor and the first lamp unit.

Alternatively, the component may be a lamp unit such as a low-beam lamp unit and a high-beam lam unit that irradiates a space in front of the vehicle. In other words, the vehicular apparatus may be a vehicle headlamp. A description will now be given of specific variations in which the vehicular apparatus is a vehicle headlamp.

Figure 18:
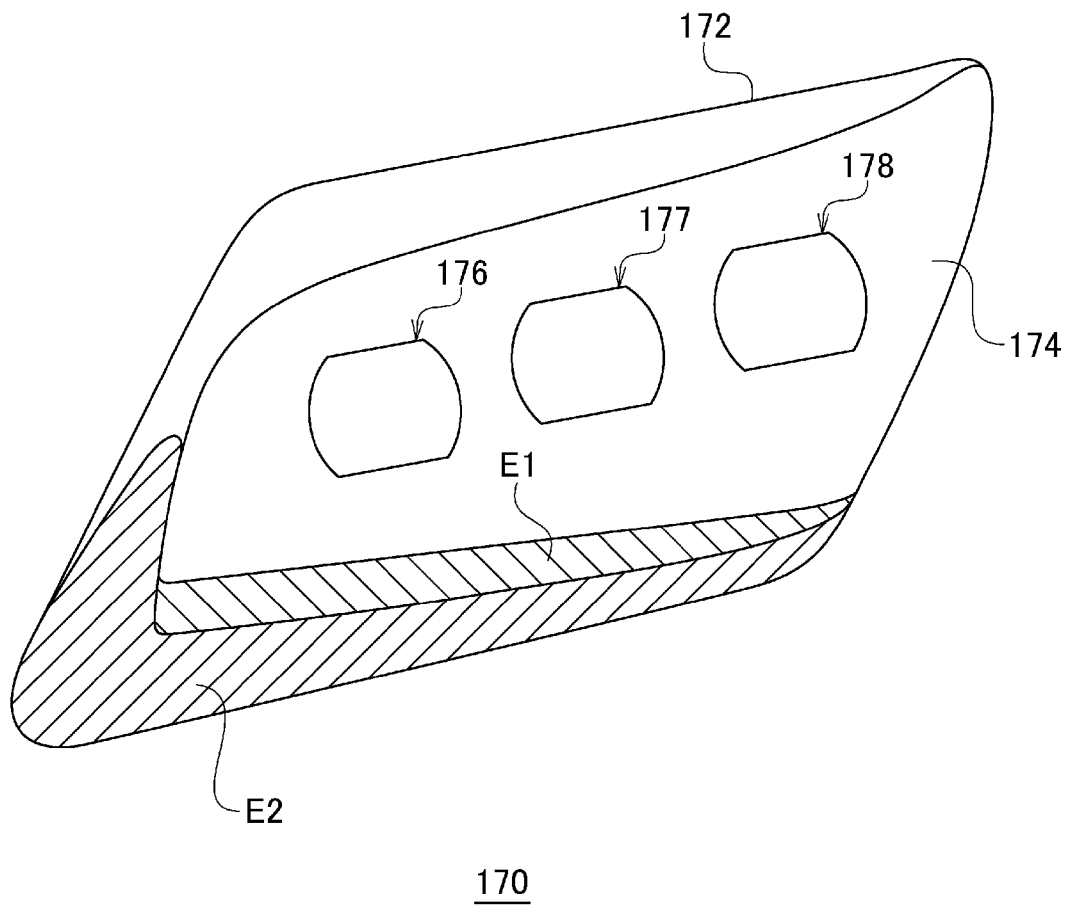
FIG. 18 is a front view showing a vehicle headlamp, which is a vehicular apparatus according to a variation.
Figure 19:
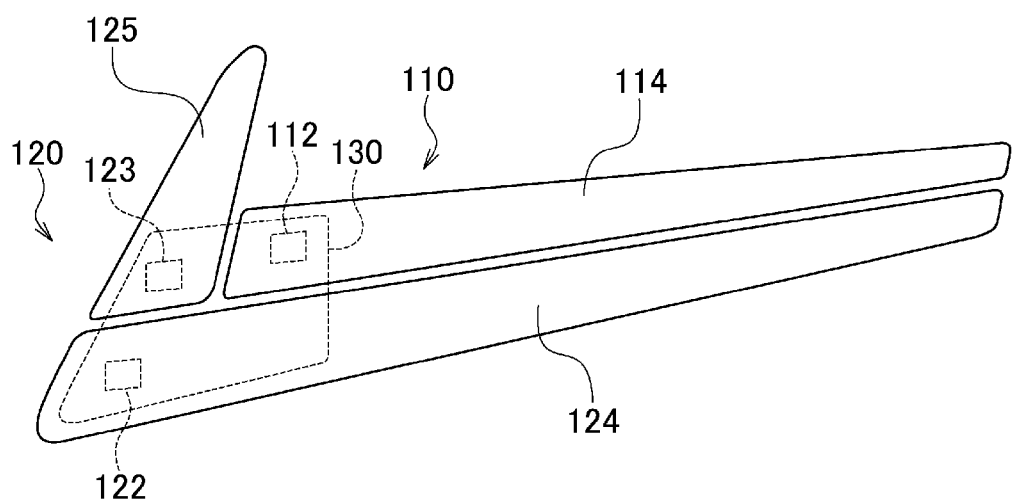
FIG. 19 is a front view showing the first lamp unit and the second lamp unit of the vehicle headlamp of FIG. 18.

A description will be given of a variation of the first embodiment. FIG. 18 is a front view showing a vehicle headlamp 170, which is a vehicular apparatus. FIG. 19 is a front view showing the first lamp unit 110 and the second lamp unit 120 of the vehicle headlamp 170 of FIG. 18. The vehicle headlamp 170 is provided with a lamp body 172, which is a housing, and a translucent cover 174. The vehicle headlamp 170 is further provided with the first lamp unit 110, the second lamp unit 120, two low-beam lamp units 176, 177, and a high-beam lamp unit 178 housed in a lamp chamber between the lamp body 172 and the translucent cover 174. In this variation the second lamp unit 120 is a daytime running lamp (DRL).

The first light conductor 114 of the first lamp unit 110 extends substantially in the direction of vehicle width. The first light source 112 is provided behind the first light conductor 114, and the light from the first light source 112 is incident on the first light conductor 114 from an incidence surface (not shown). The second light sources 122, 123 of the second lamp unit 120 emit white light in this variation. The two light conductors 124, 125 of the second lamp unit 120 as combined extend in a substantially L shape in a front view. More specifically, one second light conductor 124 extends substantially in the direction of vehicle width, and other second light conductor 125 extends diagonally upward. The second light source is provided behind each second light conductor, and the light from the second light source is incident on the second light conductor from an incidence surface (not shown). The second light conductor 124 that extends substantially in the direction of vehicle width is provided below the first light conductor 114. The first light conductor 114 and the second light conductor 124 are arranged in alignment with each other in the vertical direction.

According to this variation, the same advantage as provided by the first embodiment can be provided.

The second lamp unit may be a turn signal lamp (TSL). In this case, the second light source of the second lamp unit emits umber light.

Figure 20A:
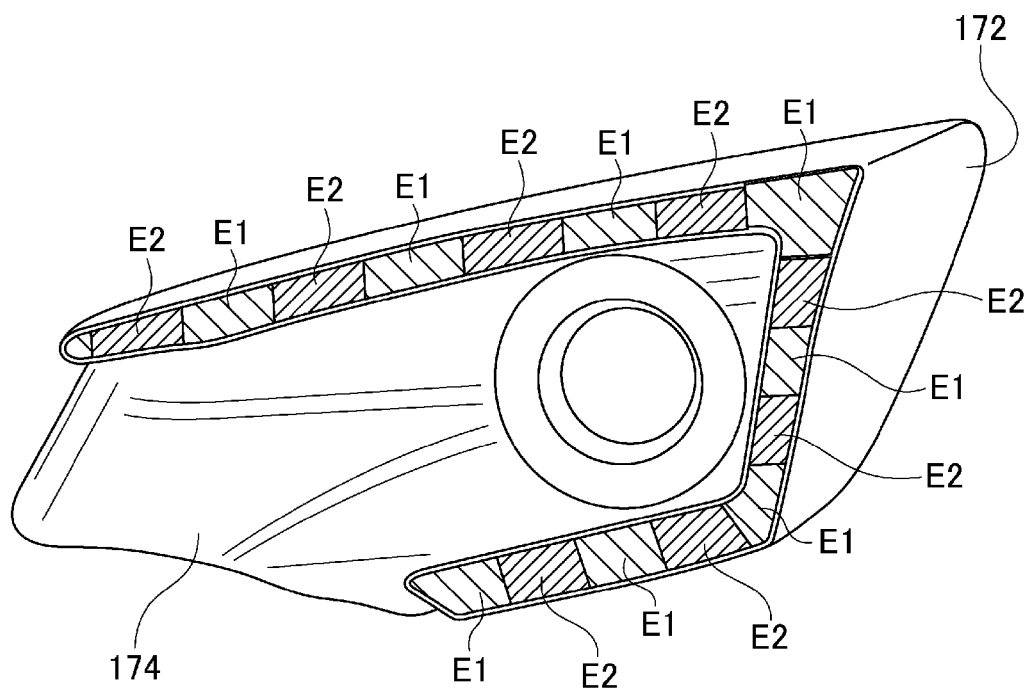
FIGS. 20A and 20B are front views each showing the vehicular headlamp.
Figure 20B:
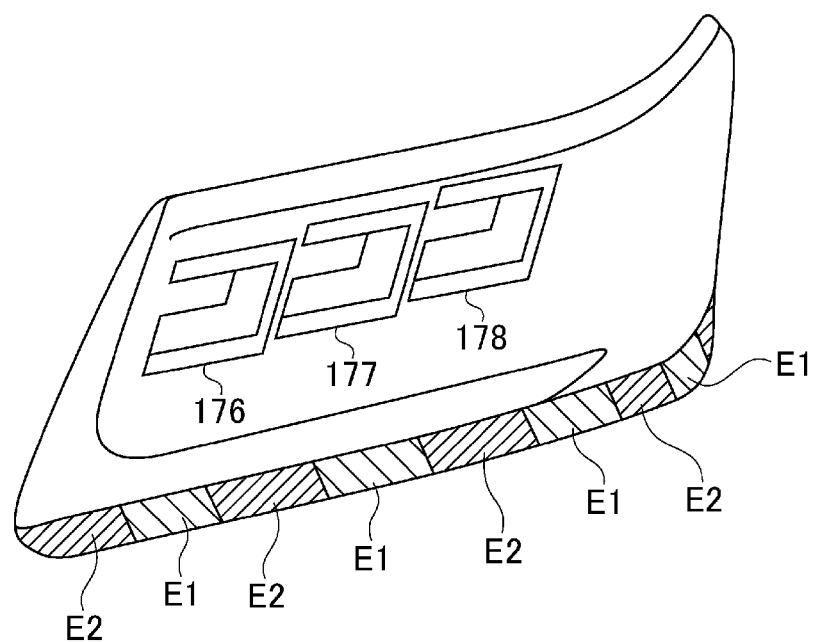

A description will now be given of a variation of the second embodiment. FIGS. 20A and 20B are front views each showing the vehicular headlamp 170. In the example of FIG. 20A, the second lamp unit is a daytime running lamp. In the example of FIG. 20B, the second lamp unit is a front turn signal lamp. The first lamp unit and the second lamp unit according to the variation and the first lamp unit and the second lamp unit according to the second embodiment are configured similarly except that the direction of extension of the first lamp unit and the second lamp unit according to the variation differs from the direction of extension of the first lamp unit and the second lamp unit according to the second embodiment.

A description will now be given of a variation to the fifth and sixth embodiments. Like the extra-vehicular rear-view apparatus according to the fifth and sixth embodiments, the vehicle headlamp 170 may further be provided with a third lamp unit that is an infrared projector or a fourth lamp unit that is a lamp unit for drawing information on a road. In this case, the light sources of the first through fourth lamp units may be mounted on a single common substrate as in the case of the fifth embodiment or mounted dispersively on two substrates that sandwich a heat dissipating member as in the case of the sixth embodiment.

(Variation 2)

In the embodiments, it is described that the light conductor of the first lamp unit is rod-shaped, the light is incident from one end of the light conductor, and the light is output from the circumferential surface or the other end, as it is guided inside the light conductor. However, the embodiment is not limited to this configuration. For example, the light conductor may be formed to have a plate shape, and the light from a plurality of light sources, arranged to face the rear surface thereof, may be incident from the rear surface and output from the front surface.

Figure 21:
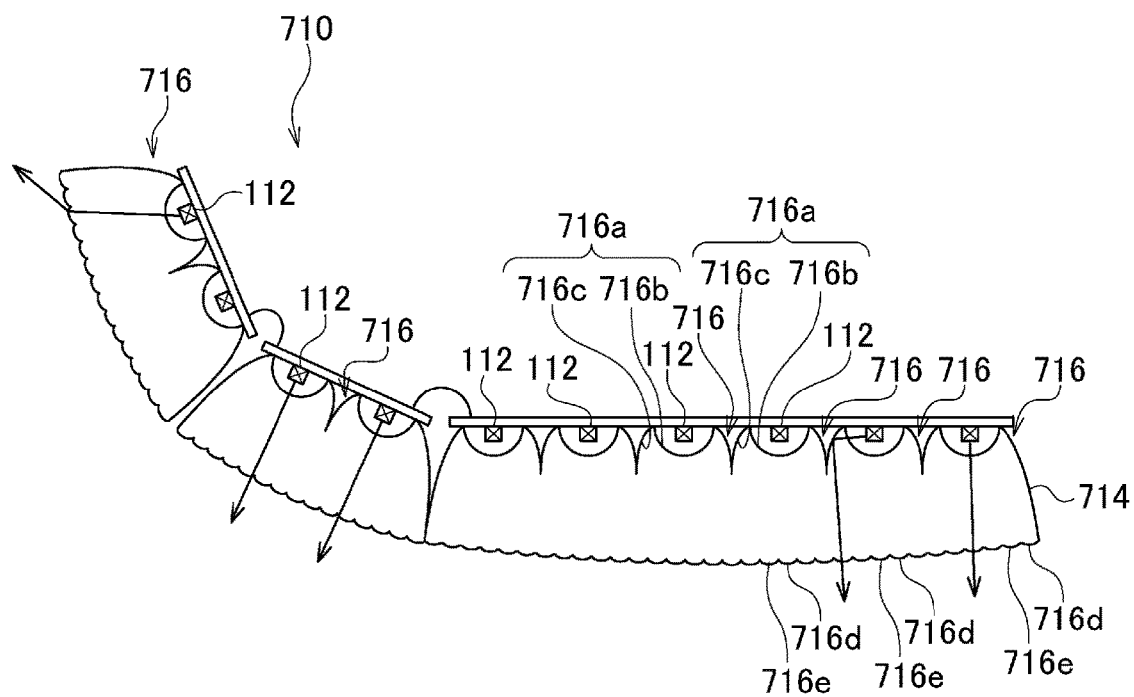
FIG. 21 is a cross-sectional view of a first lamp unit according to a variation.

FIG. 21 is a cross-sectional view of a first lamp unit 710 according to the variation. The first lamp unit 710 according to this variation includes a plurality of first light sources 112 and a plate-shaped first light conductor 714. The first light conductor 714 receives the light from the plurality of first light sources 112 from a surface opposite to the output surface, guides the light inside, and outputs the light from the output surface. More specifically, the first light conductor 714 is comprised of a plurality of light guiding elements 716 that are integrally formed. The light guiding elements 716 have similar shapes, and one first light source 112 is provided for each light guiding element 716.

Each light guiding element 716 is provided with an incidence part 716a for receiving the light from the first light source 112 inside. The incidence part 716a includes an incidence surface 716b and a reflecting surface 716c. The incidence surface 716b is formed to have a concave curved shape. The reflecting surface 716c is formed to encircle the incidence surface 716b. The light emitted from the first light source 112 is incident on the light guiding element 716 from the incidence surface 716b. The light emitted from the light source at a relatively small output angle is incident from the incidence surface 716b, travels inside the light guiding element 716 toward the output surface 716d, and is output from the output surface 716d. The light emitted from the first light source 112 at a relatively large output angle is incident from the incidence surface 716b, is reflected by the reflecting surface 716c, travels inside the light guiding element 716 toward the output surface 716d, and is output from the output surface 716d. As illustrated, a plurality of diffusive steps 716e for diffusing the output light may be formed in the output surface 716d of the light guiding element 716.

Figure 22A:
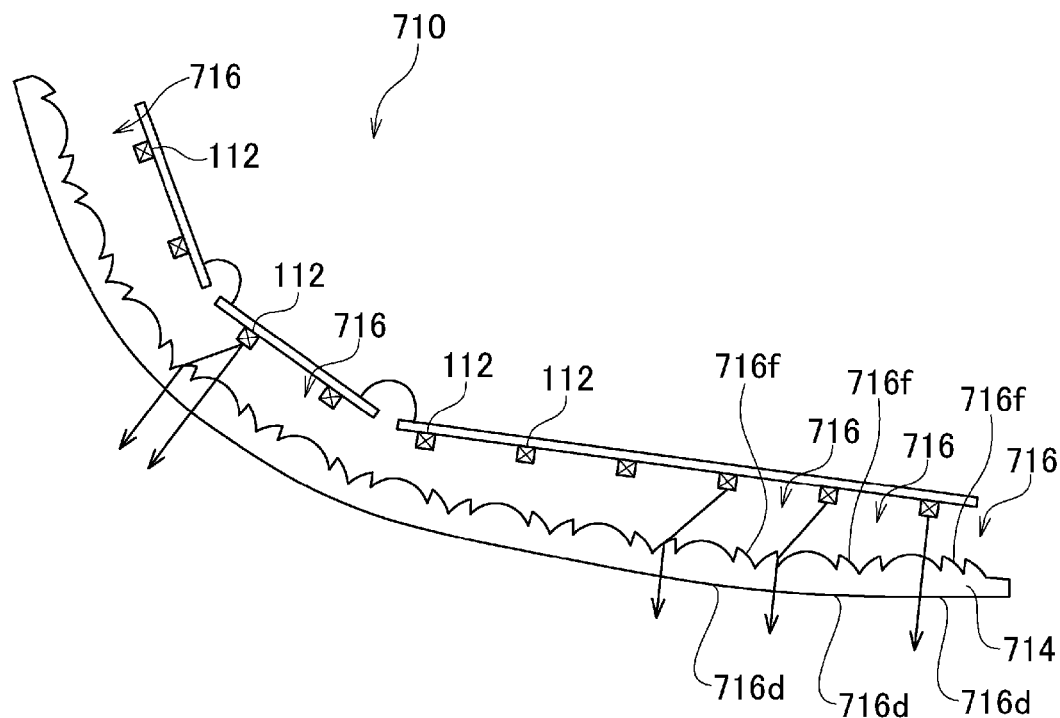
FIGS. 22A and 22B are cross-sectional views of first lamp units according to a different variations.
Figure 22B:
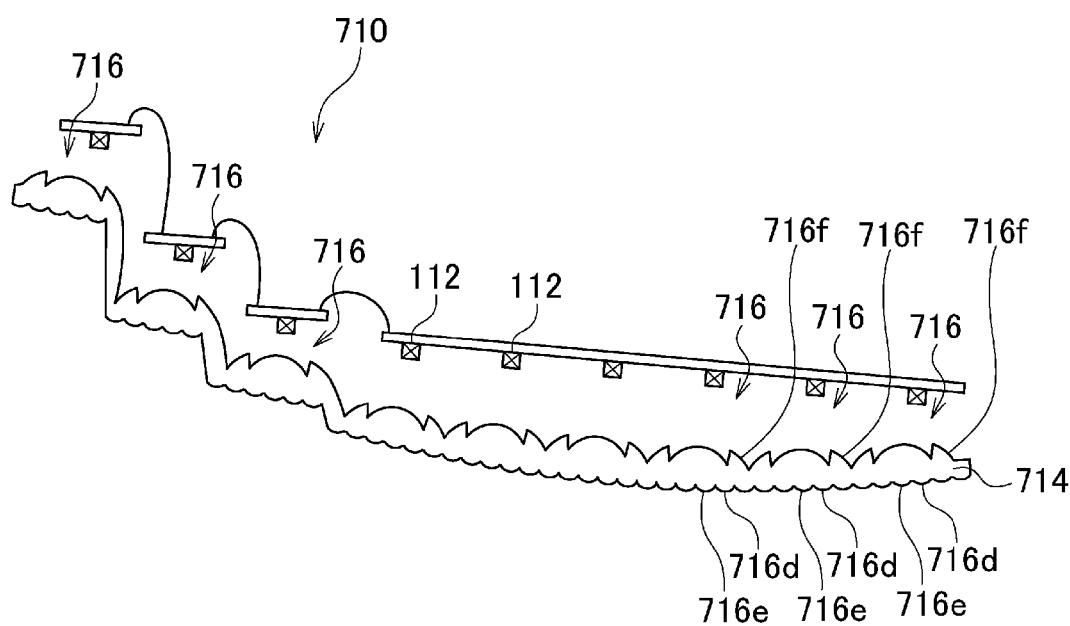

FIGS. 22A and 22B are cross-sectional views of the first lamp units 710 according to different variations. In these variations, the incidence part 716a of the light guiding element 716 is comprised of Fresnel steps 716f. The Fresnel steps 716f represent lens elements in Fresnel lenses and have a function of condensing the spread light from the first light source 112. In the example of FIG. 22A, the plurality of first light sources 112 and the plurality of light guiding elements 716 are provided such that the orientation of the first light source 112 and the light guiding element 716 changes from one end to the other end. In the example of FIG. 22B, the plurality of first light sources 112 and the plurality of light guiding elements 716 are provided such that they are substantially identically oriented.

In these variations, the first lamp unit is provided with a plurality of light sources so that the light intensity of the light output from the first lamp unit can be increased. This will make it possible to meet a regulation that requires a relatively high light intensity of the first lamp unit for alerting that the vehicle is automatically driven, when the regulation is introduced.

(Variation 3)

In the embodiments, it is described that the first light source 112 emits turquoise light. The embodiments are non-limiting, and the requirement is that the first lamp unit is capable of outputting turquoise light.

Figure 23A:
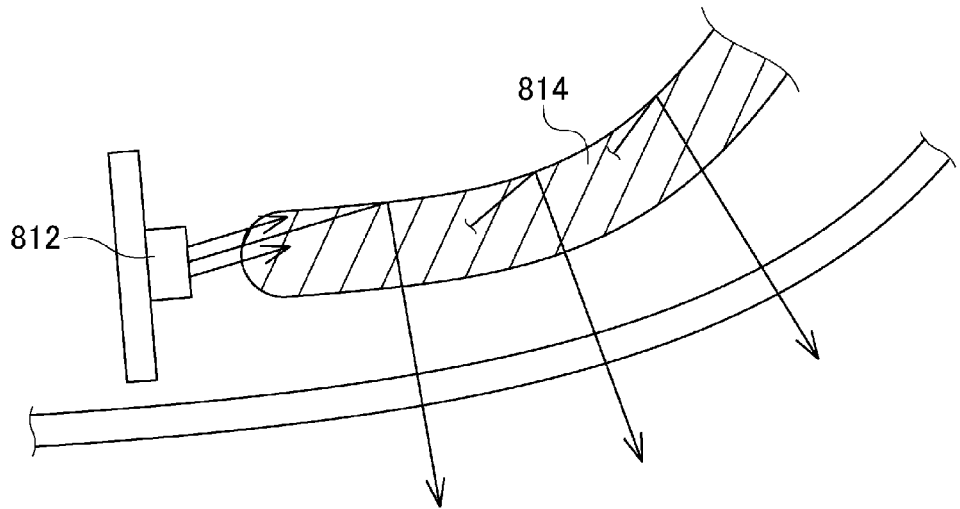
FIGS. 23A-23C are diagrams each showing a first lamp unit for outputting turquoise light.
Figure 23B:
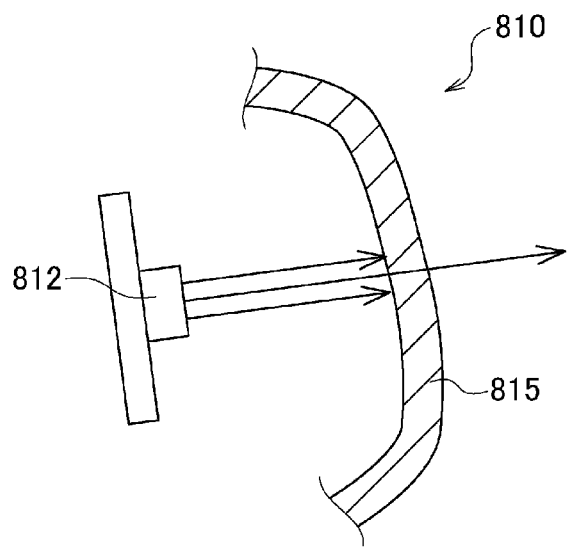
Figure 23C:
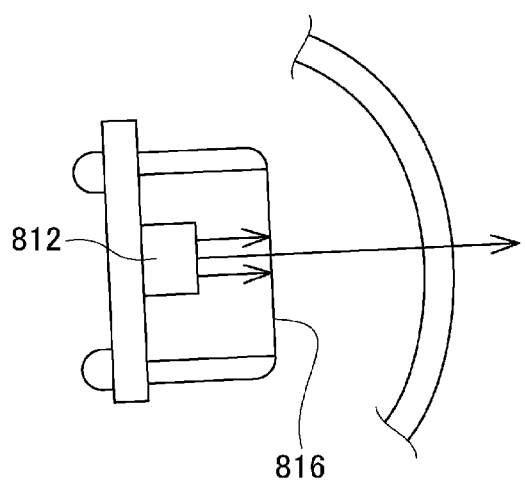

FIGS. 23A-23C are diagrams each showing a first lamp unit 810 for outputting turquoise light. In the example of FIG. 23A, the first lamp unit 810 includes a first light source 812 for emitting white light and a light conductor 814. In the example of FIG. 23B, the first lamp unit 810 includes a first light source 812 and a lens 815 provided on a light path of white light from the first light source 812. In the example of FIG. 23C, the first lamp unit 810 includes a first light source 812 and a film 816 provided on a light path of white light from the first light source 812. The light conductor 814 of FIG. 23A, the lens 815 of FIG. 23B, and the film 816 of FIG. 23C contain, for example, a coloring matter such dye and pigment of turquoise color mixed therein and are colored in turquoise. The components of the light from the first light source 812 other than those of turquoise color are absorbed by the light conductor 814, the lens 815, and the film 816 so that the light transmitted therethrough exhibits turquoise color.

Any combination of the embodiment and a variation will also be useful as an embodiment of the present invention. A new embodiment created by a combination will provide the combined advantages of the embodiment and the variation as combined. It will be understood by a skilled person that the functions that should be achieved by the constituting elements recited in the claims are implemented either alone or in combination by the constituting elements shown in the embodiments and the variations.

INDUSTRIAL APPLICABILITY

The present invention is applicable to a vehicular apparatus, and, in particular, a vehicular apparatus for outputting light for alerting that the vehicle is being automatically driven.

What is claimed is:

1. A vehicular apparatus comprising:
   a housing that is configured to be attached to a vehicle; and first and second lamp units that are provided in the housing and include first and second light sources respectively, that emit light having main wavelengths in mutually different wavelength ranges, wherein the first lamp unit is a lamp unit for alerting that the vehicle is being automatically driven when the vehicle is being automatically driven and emits light having a main wavelength in 490 nm-498 nm while the vehicle is being automatically driven, and wherein the second lamp unit is a turn signal lamp, a light emission region formed by light emitted from the first lamp unit and a light emission region formed by light emitted from the second lamp unit extend in the same direction.

2. The vehicular apparatus according to claim 1, wherein the first light source and the second light source are mounted on the same substrate.

3. The vehicular apparatus according to claim 1, wherein the first light source and the second light source are respectively mounted on first and second substrates provided to sandwich a heat dissipating member.

4. The vehicular apparatus according to claim 1, wherein each of the first and second lamp units further includes first and second light conductors for controlling light from the first and second light sources, respectively.

5. The vehicular apparatus according to claim 4, wherein the first light conductor and the second light conductor are arranged in alignment with each other.

6. The vehicular apparatus according to claim 5, wherein the first light conductor and the second light conductor are arranged in alignment with each other in a horizontal direction, and light output from the second light conductor is transmitted through the first light conductor and output outside the vehicular apparatus, and the first light conductor and the second light conductor are formed such that light from the first light conductor and light from the second light conductor are not mixed.

7. The vehicular apparatus according to claim 4, wherein the first light conductor and the second light conductor are adjacent to each other and are formed such that extensions from respective output surfaces are smoothly continuous with each other.

8. The vehicular apparatus according to claim 1, wherein the first lamp unit and the second lamp unit further include a single light conductor for controlling light from the first light source and the second light source.

9. The vehicular apparatus according to claim 1, wherein the light emission region formed by light emitted from the first lamp unit and the light emission region formed by the light emitted from the second lamp unit extend parallel to each other.

10. The vehicular apparatus according to claim 1, wherein the light emission region formed by the light emitted from the first lamp unit and the light emission region formed by light emitted from the second lamp unit present a continuous linear or belt-like region.

* * * * *